(12) United States Patent
Fujiwara

(10) Patent No.: US 12,323,747 B2
(45) Date of Patent: Jun. 3, 2025

(54) CONTROL DEVICE, CONTROL METHOD, AND CONTROL PROGRAM FOR AUGMENTED REALITY DEVICE WHICH ADJUSTS A PROJECTION IMAGE BRIGHTNESS ACCORDING TO A MEASURED USER PUPIL SIZE

(71) Applicant: FUJIFILM Corporation, Tokyo (JP)

(72) Inventor: Shinya Fujiwara, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 140 days.

(21) Appl. No.: 18/183,709

(22) Filed: Mar. 14, 2023

(65) Prior Publication Data

US 2023/0308619 A1    Sep. 28, 2023

(30) Foreign Application Priority Data

Mar. 25, 2022  (JP) ................................ 2022-050809

(51) Int. Cl.
   *H04N 9/31*      (2006.01)
   *G06F 3/01*      (2006.01)
(52) U.S. Cl.
   CPC ........... *H04N 9/3179* (2013.01); *G06F 3/013* (2013.01); *H04N 9/3173* (2013.01)
(58) Field of Classification Search
   CPC ..... H04N 9/3179; H04N 9/3173; G06F 3/013
   See application file for complete search history.

(56) References Cited

U.S. PATENT DOCUMENTS

| 2018/0052513 | A1* | 2/2018 | Le Gros | G02B 27/0093 |
| 2018/0365875 | A1 | 12/2018 | Yildiz et al. | |
| 2022/0197377 | A1* | 6/2022 | Kim | G06V 40/18 |

FOREIGN PATENT DOCUMENTS

JP    2013-114123 A    6/2013

OTHER PUBLICATIONS

Extended European Search Report for European Application No. 23162120.2, dated Jun. 23, 2023.

* cited by examiner

*Primary Examiner* — Benjamin C Lee
*Assistant Examiner* — Nathan P Brittingham
(74) *Attorney, Agent, or Firm* — Birch, Stewart, Kolasch & Birch, LLP

(57) ABSTRACT

A control device includes a processor that controls a glasses-type display device to control projection of a projection image, and the device includes a transmission unit that provides a real image to an eye of a user and a projection unit. The processor is configured to acquire a first size of a pupil of the eye of the user, which is obtained in a case in which the projection unit projects the projection image with a first brightness, with regard to the size of the pupil of the eye of the user, acquires a second size of the pupil, which is obtained in a case in which the projection unit projects the projection image with a second brightness higher than the first brightness, and controls a brightness of the projection image projected onto the transmission unit according to a result of comparison between the first size and the second size.

17 Claims, 16 Drawing Sheets

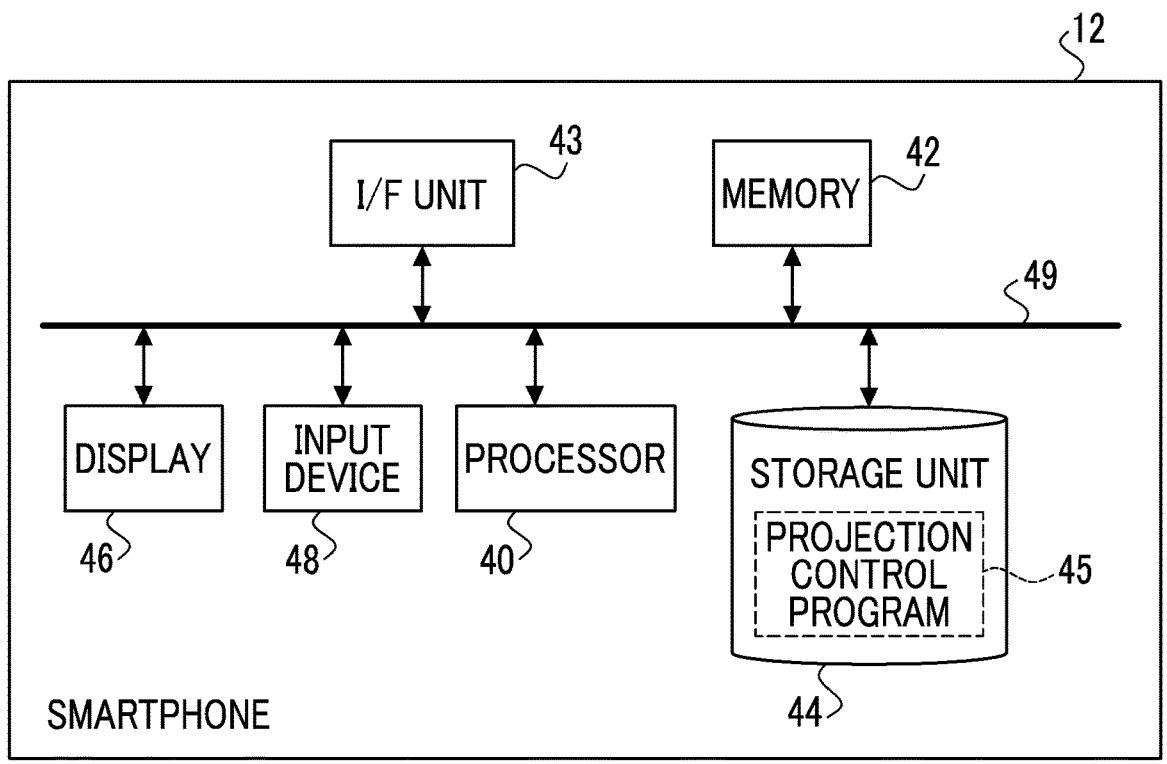

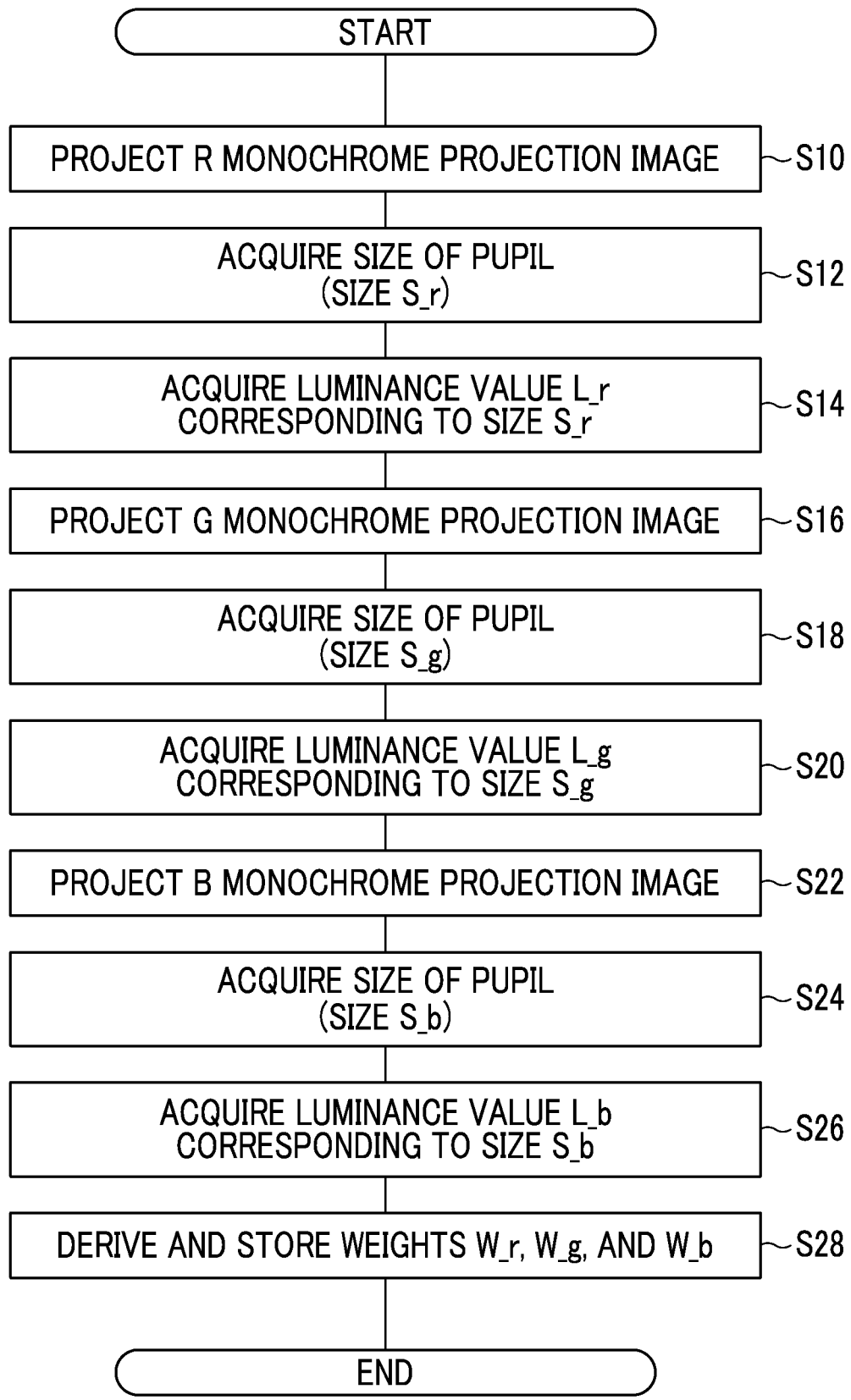

CONTROL DEVICE, CONTROL METHOD, AND CONTROL PROGRAM FOR AUGMENTED REALITY DEVICE WHICH ADJUSTS A PROJECTION IMAGE BRIGHTNESS ACCORDING TO A MEASURED USER PUPIL SIZE

CROSS REFERENCE TO RELATED APPLICATIONS

This application claims priority from Japanese Application No. 2022-050809, filed on Mar. 25, 2022, the entire disclosure of which is incorporated herein by reference.

BACKGROUND

1. Technical Field

The present disclosure relates to a control device, a control method, and a non-transitory storage medium storing a control program.

2. Related Art

A glasses-type information display device, such as an augmented reality (AR) device that displays a state in which an image is superimposed on a real world, is known in the related art as a display device that displays a three-dimensional video.

As the glasses-type information display device, there is a glasses-type information display device including a transmission unit that provides a real image to the eye of a user and a projection unit that projects a projection image onto the transmission unit such that the projection image is capable of being visually recognized with the eye of the user. In a case in which a user uses the glasses-type information display device, an eye of the user visually recognizing the projection image is under strain and is fatigued.

Accordingly, there is a technique disclosed in, for example, JP2013-114123A to reduce the fatigue of the eye of the user. JP2013-114123A discloses a technique that measures the size of a pupil of a user and estimates the fatigue of the eye of the user from the size of the pupil.

According to the technique disclosed in JP2013-114123A, the fatigue of the eye of the user is estimated and the projection of a projection image can be controlled according to the fatigue, but it is not enough to reduce strain on the eye of the user. Further, the visibility of the projection image is not considered and the visibility of the projection image might deteriorate.

SUMMARY

The present disclosure has been made in consideration of the above-mentioned circumstances, and an object of the present disclosure is to provide a control device, a control method, and a non-transitory storage medium storing a control program that can maintain the visibility of a projection image well and can reduce strain on an eye of a user.

A control device according to a first aspect of the present disclosure comprises a processor that controls a glasses-type display device to control projection of a projection image, and the glasses-type display device includes a transmission unit that provides a real image to an eye of a user and a projection unit that projects the projection image onto the transmission unit such that the projection image is capable of being visually recognized with the eye of the user. The processor is configured to acquire a first size of a pupil of the eye of the user, which is obtained in a case in which the projection unit projects the projection image with a first brightness, with regard to the size of the pupil of the eye of the user, acquire a second size of the pupil, which is obtained in a case in which the projection unit projects the projection image with a second brightness higher than the first brightness, and control a brightness of the projection image projected onto the transmission unit according to a result of comparison between the first size and the second size.

According to a second aspect of the present disclosure, in the control device according to the first aspect, the processor is configured to perform a control to maintain the brightness of the projection image in a case in which the first size is larger than the second size and a difference between the first size and the second size is equal to or smaller than a predetermined threshold value.

According to a third aspect of the present disclosure, in the control device according to the first aspect, the processor is configured to perform a control to reduce the brightness of the projection image in a case in which the first size is larger than the second size and a difference between the first size and the second size is larger than a predetermined threshold value.

According to a fourth aspect of the present disclosure, in the control device according to any one of the first to third aspects, the processor is configured to perform a control to increase the brightness of the projection image in a case in which the first size is equal to the second size.

According to a fifth aspect of the present disclosure, in the control device according to any one of the first to fourth aspects, the processor is configured to perform a control to increase the brightness of the projection image in a case in which the first size is smaller than the second size.

According to a sixth aspect of the present disclosure, in the control device according to any one of the first to fifth aspects, on the basis of reference correspondence relationship information that indicates a correspondence relationship between a brightness of a visually recognized image and a size of a pupil of an eye visually recognizing the image, the processor is configured to derive the brightness of the visually recognized image corresponding to the first size as the brightness of the projection image that is projected to acquire the second size.

According to a seventh aspect of the present disclosure, in the control device according to the sixth aspect, the processor is configured to use information, which indicates a correspondence relationship between the brightness of the projection image and a size of a pupil of the user obtained in cases in which the projection image is projected with different brightnesses, as the reference correspondence relationship information.

According to an eighth aspect of the present disclosure, in the control device according to the sixth or seventh aspect, the processor is configured to update the reference correspondence relationship information using values that indicate a post-control correspondence relationship in which the brightness of the projection image controlled according to the result of comparison between the first size and the second size is set as the brightness of the visually recognized image and the first size is set as the size of the pupil of the eye visually recognizing the image.

According to a ninth aspect of the present disclosure, in the control device according to the eighth aspect, the processor is configured to sequentially exclude values, which indicate the post-control correspondence relationship and have early update timings, from the reference correspondence relationship information to control the number of values, which indicate the post-control correspondence relationship and are included in the reference correspondence relationship information, to a predetermined number or less.

According to a tenth aspect of the present disclosure, in the control device according to the eighth or ninth aspect, the processor is configured to control the number of values, which indicate the post-control correspondence relationship and are included in the reference correspondence relationship information, to a first predetermined number or less for each predetermined range determined according to the size of the pupil of the eye visually recognizing the image in the reference correspondence relationship information.

According to an eleventh aspect of the present disclosure, in the control device according to the eighth or ninth aspect, the processor is configured to control the number of values, which indicate the post-control correspondence relationship and are included in the reference correspondence relationship information, to a second predetermined number or less for each predetermined range determined according to the brightness of the visually recognized image in the reference correspondence relationship information.

According to a twelfth aspect of the present disclosure, in the control device according to the sixth or seventh aspect, the processor is configured to determine a representative value of values, which indicate a correspondence relationship between the brightness of the visually recognized image and the size of the pupil of the eye visually recognizing the image, for each predetermined range determined according to the size of the pupil of the eye visually recognizing the image in the reference correspondence relationship information, for each predetermined range determined according to the brightness of the visually recognized image in the reference correspondence relationship information, or for each predetermined range determined according to the size of the pupil of the eye visually recognizing the image and the brightness of the visually recognized image in the reference correspondence relationship information, and derive the reference correspondence relationship information using the representative values.

According to a thirteenth aspect of the present disclosure, in the control device according to the twelfth aspect, the processor is configured to update the representative values using values that indicate a post-control correspondence relationship in which the brightness of the projection image controlled according to the result of comparison between the first size and the second size is set as the brightness of the visually recognized image and the first size is set as the size of the pupil of the eye visually recognizing the image.

According to a fourteenth aspect of the present disclosure, in the control device according to the thirteenth aspect, the processor is configured to update the representative values that are obtained by weighting the values indicating the post-control correspondence relationship.

A control method according to a fifteenth aspect of the present disclosure is a control method performed by a processor of a control device, the processor controls a glasses-type display device to control projection of a projection image, and the glasses-type display device includes a transmission unit that provides a real image to an eye of a user and a projection unit that projects the projection image onto the transmission unit such that the projection image is capable of being visually recognized with the eye of the user. The control method comprises: acquiring a first size of a pupil of the eye of the user, which is obtained in a case in which the projection unit projects the projection image with a first brightness, with regard to the size of the pupil of the eye of the user; acquiring a second size of the pupil, which is obtained in a case in which the projection unit projects the projection image with a second brightness higher than the first brightness; and controlling a brightness of the projection image projected onto the transmission unit according to a result of comparison between the first size and the second size.

According to a sixteenth aspect of the present disclosure, in the control method according to the fifteenth aspect, a control to maintain the brightness of the projection image is performed in a case in which the first size is larger than the second size and a difference between the first size and the second size is equal to or smaller than a predetermined threshold value.

A non-transitory storage medium according to a seventeenth aspect of the present disclosure is a non-transitory storage medium storing a control program executed by a processor of a control device, the processor controls a glasses-type display device to control projection of a projection image, and the glasses-type display device includes a transmission unit that provides a real image to an eye of a user and a projection unit that projects the projection image onto the transmission unit such that the projection image is capable of being visually recognized with the eye of the user. The control program causes the processor to perform processing comprising: acquiring a first size of a pupil of the eye of the user, which is obtained in a case in which the projection unit projects the projection image with a first brightness, with regard to the size of the pupil of the eye of the user; acquiring a second size of the pupil, which is obtained in a case in which the projection unit projects the projection image with a second brightness higher than the first brightness; and controlling a brightness of the projection image projected onto the transmission unit according to a result of comparison between the first size and the second size.

According to an eighteenth aspect of the present disclosure, in the non-transitory storage medium according to the seventeenth aspect, the control program is executable by the processor to maintain the brightness of the projection image is performed in a case in which the first size is larger than the second size and a difference between the first size and the second size is equal to or smaller than a predetermined threshold value.

According to the present disclosure, it is possible to maintain the visibility of a projection image well and to reduce strain on an eye of a user.

BRIEF DESCRIPTION OF THE DRAWINGS

FIG. 4 is a block diagram showing an example of the configuration of a smartphone of a first embodiment.

FIG. 5 is a diagram illustrating a relationship between the brightness of a projection image with respect to a real image and strain on an eye that visually recognizes the projection image.

FIG. 19 is a flowchart showing an example of weighting acquisition processing that is performed by a smartphone of a third embodiment.

DESCRIPTION OF THE PREFERRED EMBODIMENTS

Examples of an embodiment of a technique of the present disclosure will be described in detail below with reference to the drawings.

First Embodiment

Figure 1:
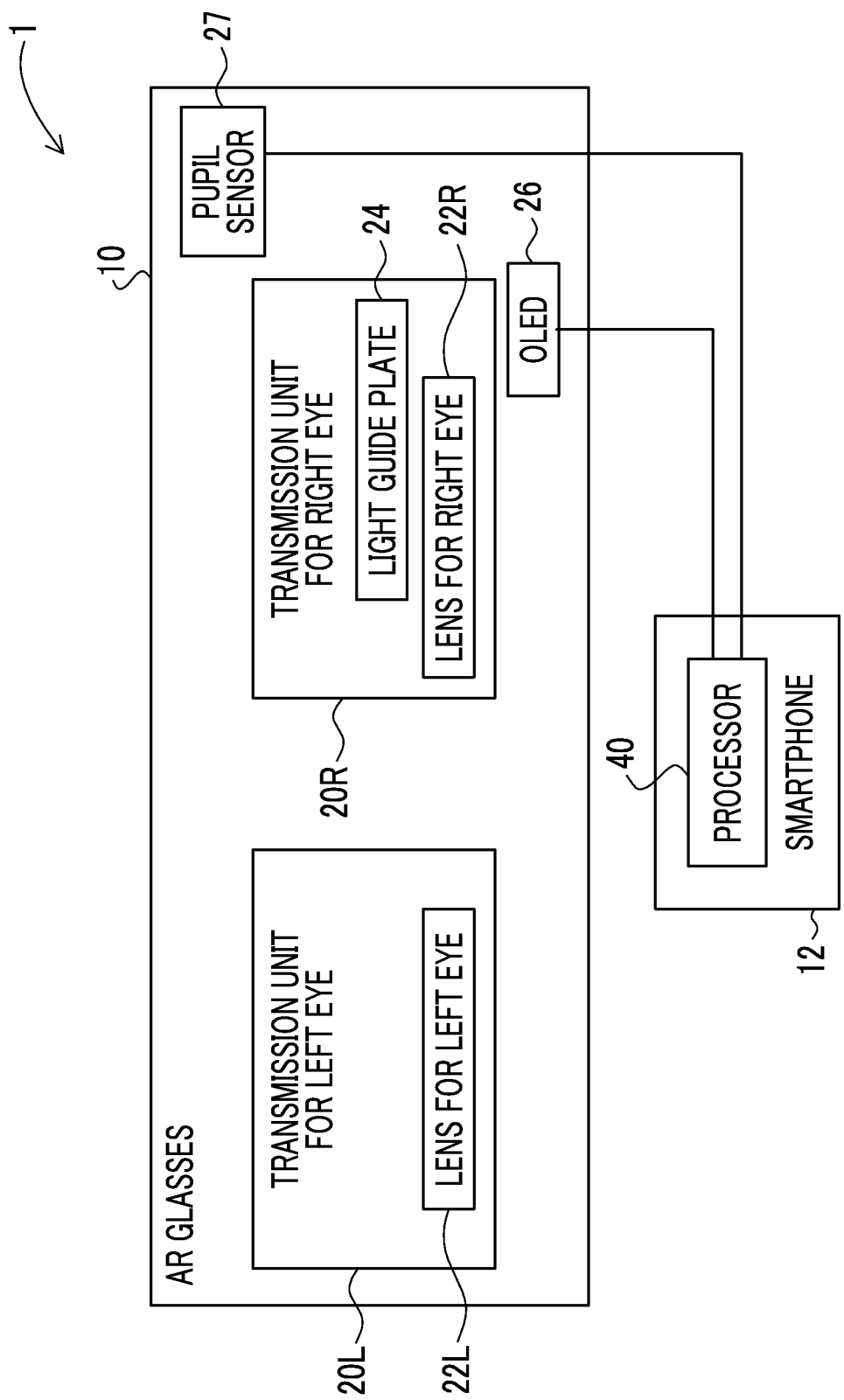
FIG. 1 is a diagram showing an example of the configuration of a glasses-type information display device of an embodiment.

The configuration of a display system 1 of the present embodiment will be described with reference to FIG. 1. As shown in FIG. 1, the display system 1 of the present embodiment comprises augmented reality (AR) glasses 10 and a smartphone 12. The AR glasses 10 of the present embodiment is an example of a glasses-type information display device of the present disclosure, and the smartphone 12 of the present embodiment is an example of a control device of the present disclosure.

Figure 2:
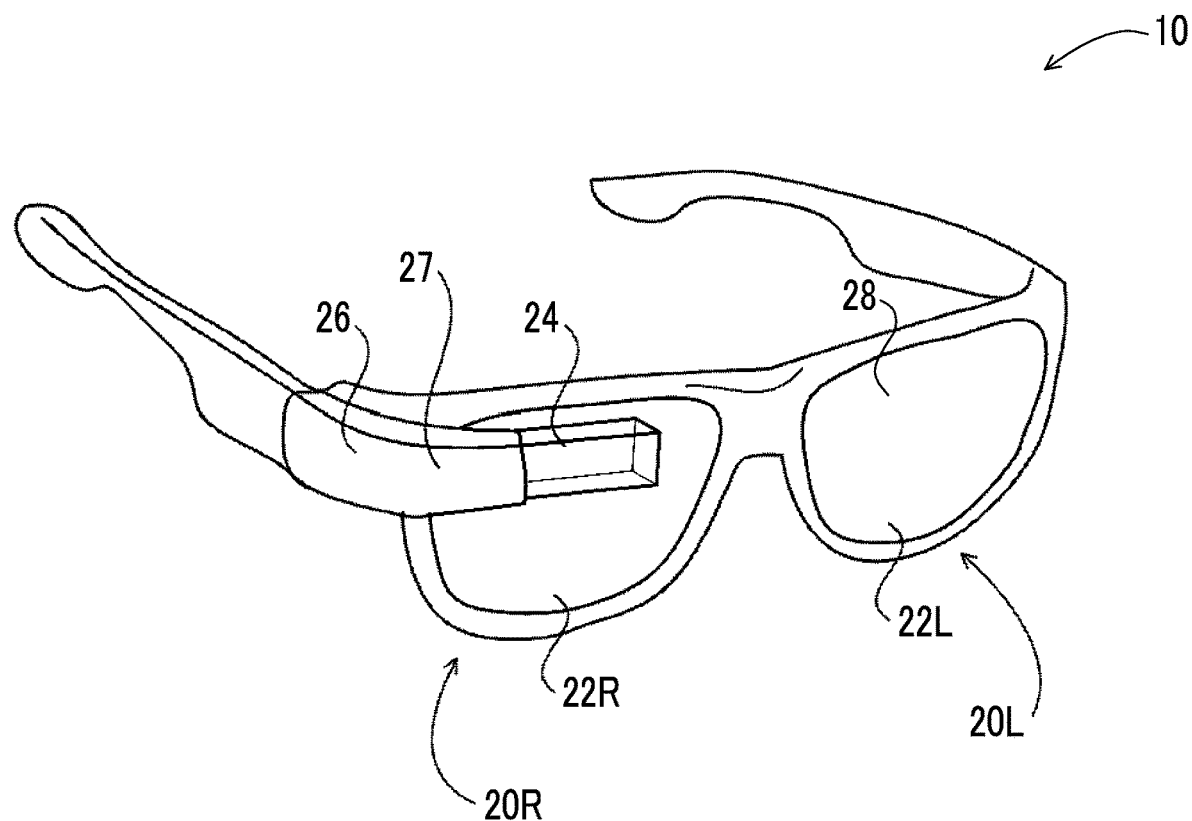
FIG. 2 is a perspective view showing an example of AR glasses of the embodiment.

The AR glasses 10 are a device that allows a user to visually recognize a projection image projected from an organic light emitting diode (OLED) 26 in a state where the projection image is superimposed on a real image. FIG. 2 is a perspective view showing an example of the AR glasses 10 of the present embodiment. As shown in FIGS. 1 and 2, the AR glasses 10 comprise a pair of a transmission unit 20L for a left eye and a transmission unit 20R for a right eye, an OLED 26, and a pupil sensor 27. The transmission unit 20R for a right eye of the present embodiment is an example of a transmission unit of the present disclosure. Further, the OLED 26 of the present embodiment is an example of a projection unit of the present disclosure.

The OLED 26 projects a projection image onto a light guide plate 24 so that the projection image is displayed in a state where the projection image is superimposed on a real image visually recognized with the right eye of a user through the transmission unit 20R for a right eye.

The transmission unit 20R for a right eye includes a lens 22R for a right eye and a light guide plate 24. Light corresponding to the projection image projected from the OLED 26 is incident on one end of the light guide plate 24. The direction of light propagated through the light guide plate 24 is changed at an emission portion (not shown), and the light is emitted toward the eye of the user. The light, which is emitted from the light guide plate 24 and corresponds to the projection image, is transmitted through the lens 22R for a right eye and is guided to the right eye of the user. Further, the user visually recognizes a real world, which is shown through the lens 22R for a right eye, as the real image with the right eye.

For this reason, while the projection image is projected from the OLED 26, the visually-recognized image visually recognized with the right eye of the user is in a state where the projection image projected onto the light guide plate 24 is superimposed on the real image representing the real world shown through the lens 22R for a right eye. Further, while the projection image is not projected from the OLED 26, the visually-recognized image visually recognized by the user is the real image that represents the real world shown through the lens 22R for a right eye and the light guide plate 24.

Meanwhile, the transmission unit 20L for a left eye includes a lens 22L for a left eye. The user visually recognizes the real world, which is shown through the lens 22L for a left eye, with the left eye.

Figure 3:
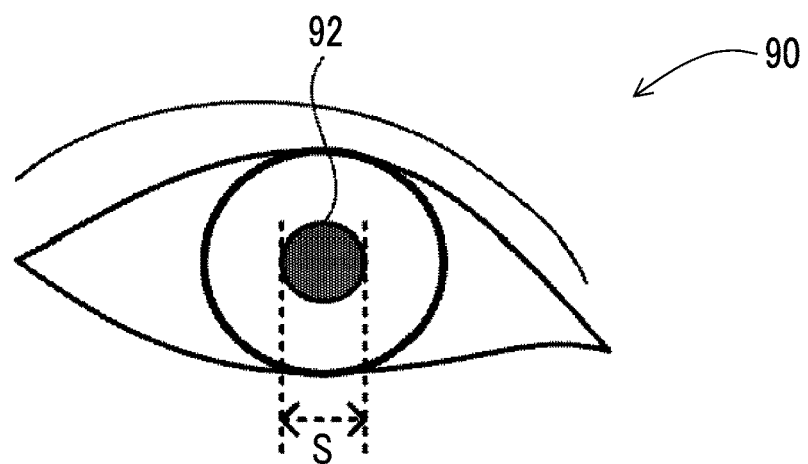
FIG. 3 is a diagram illustrating the size of a pupil that is detected by a pupil sensor.

The pupil sensor 27 is a sensor that has a function of detecting the size of a pupil of the right eye of the user. As shown in FIG. 3, a pupil 92, which is a so-called iris, is present in a human eye. The pupil 92 is changed in size (dilates and contracts) to adjust the amount of light entering an eye 90. The pupil sensor 27 is a sensor that detects a diameter S of the pupil 92 as the size of the pupil 92. The pupil sensor 27 is not particularly limited, and a camera, which outputs a captured image obtained from the image pickup of the eye 90 to the smartphone 12, is employed as the pupil sensor 27 of the present embodiment by way of example. A timing at which the pupil sensor 27 picks up the image of the eye 90 is not particularly limited, and may be, for example, a timing at which each of a first acquisition unit 50 and a second acquisition unit 52 to be described later acquires a captured image.

Meanwhile, the smartphone 12 comprises a processor 40. The processor 40 of the present embodiment controls the OLED 26 to project a projection image onto the light guide plate 24 from the OLED 26.

FIG. 4 is a block diagram showing an example of the configuration of the smartphone 12 that is related to functions related to the control of projection of a projection image. As shown in FIG. 4, the smartphone 12 comprises a processor 40, a memory 42, an interface (I/F) unit 43, a storage unit 44, a display 46, and an input device 48. The processor 40, the memory 42, the I/F unit 43, the storage unit 44, the display 46, and the input device 48 are connected to each other via a bus 49, such as a system bus or a control bus, such that various types of information can be given and received therebetween.

The processor 40 reads out various programs, which include a projection control program 45 stored in the storage unit 44, to the memory 42 and performs processing corresponding to the program read out. Accordingly, the processor 40 controls the projection of the projection image that is performed by the OLED 26. The memory 42 is a work memory that is used in a case where the processor 40 performs processing.

The projection control program 45, the image data (not shown) of the projection image projected from the OLED 26, various other types of information, and the like are stored in the storage unit 44. Specific examples of the storage unit 44 include a hard disk drive (HDD), a solid state drive (SSD), and the like.

The I/F unit 43 communicates various types of information to each of the OLED 26 and the pupil sensor 27 via wireless communication or wired communication. The display 46 and the input device 48 function as a user interface. The display 46 provides various types of information, which is related to the projection of the projection image, to a user. The display 46 is not particularly limited, and examples of the display 46 include a liquid crystal monitor, a light emitting diode (LED) monitor, and the like. Further, the input device 48 is operated by a user so that various instructions related to the projection of the projection image are input. The input device 48 is not particularly limited, and examples of the input device 48 include a keyboard, a touch pen, a mouse, and the like. A touch panel display in which the display 46 and the input device 48 are integrated with each other is employed in the smartphone 12.

Further, the functions of the smartphone 12 of the present embodiment will be described. The processor 40 of the smartphone 12 of the present embodiment has a function of controlling the brightness of a projection image projected onto the OLED 26 as the control of the projection of the projection image. Specifically, the smartphone 12 of the present embodiment controls the brightness of a projection image projected onto the OLED 26 on the basis of the size S of the pupil 92 of the eye 90 of the user that visually recognizes the projection image.

Here, a relationship between the brightness of a projection image, the size of the pupil 92 of the eye 90 that visually recognizes the projection image, and strain on the eye 90 will be described.

In general, in a case where the brightness of a projection image is too high, strain on the eye 90 is large. For example, in a case where a projection image is too bright with respect to surroundings, strain on the eye 90 is increased. On the other hand, as a projection image is brighter, it is easier to visually recognize the projection image and the visibility of the projection image is higher. For this reason, in a case where a user visually recognizes a real image and a case where a user visually recognizes a projection image superimposed on the real image as in a case where the user uses the AR glasses 10, there is a relationship shown in FIG. 5 between the brightness of the projection image with respect to the real image and strain on the eye 90 that visually recognizes the projection image. As shown in FIG. 5, in a case where a projection image is much darker than the real image, the visibility of the projection image deteriorates but strain on the eye 90 is small. On the other hand, in a case where the projection image is much brighter than the real image, the visibility of the projection image is good but strain on the eye 90 is increased. As described above, the visibility of the projection image and strain on the eye 90, which visually recognizes the projection image, are in a reciprocal relationship.

Meanwhile, the size S of the pupil 92 of the eye 90 is increased or reduced according to the amount of light entering the eye as described above. In general, in a case where the surroundings are bright, the pupil 92 contracts to reduce the amount of light entering the eye 90. In a case where the surroundings are dark, the pupil 92 dilates to increase the amount of light entering the eye 90. Accordingly, the smartphone 12 of the present embodiment controls the brightness of the projection image according to the size of the pupil 92 of the eye 90.

Figure 6A:
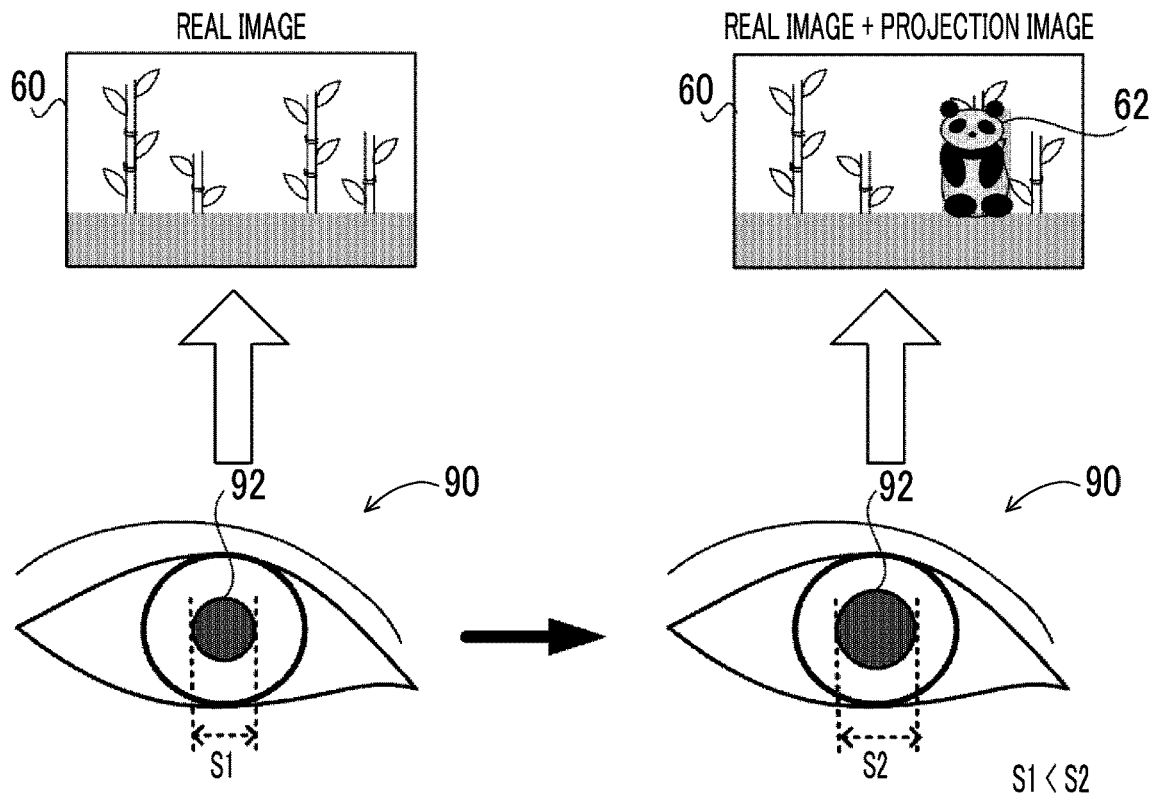
FIG. 6A is a diagram illustrating a relationship between the size of a pupil of an eye that visually recognizes a real image, the size of a pupil of an eye that visually recognizes a projection image superimposed on the real image, and the brightness of the projection image.

FIG. 6A shows a case where a size S2 of a pupil 92 of an eye 90 visually recognizing a projection image 62 superimposed on a real image 60 is larger than a size S1 of a pupil 92 of an eye 90 visually recognizing the real image 60 (S1<S2). Since the projection image 62 is darker than the real image 60 and the amount of light of the projection image 62 is small in the case shown in FIG. 6A, the pupil 92 of the eye 90 visually recognizing the projection image 62 dilates. In this case, strain on the eye 90 is small but the visibility of the projection image 62 is poor. Accordingly, the smartphone 12 performs a control to increase the brightness of the projection image 62.

Figure 6B:
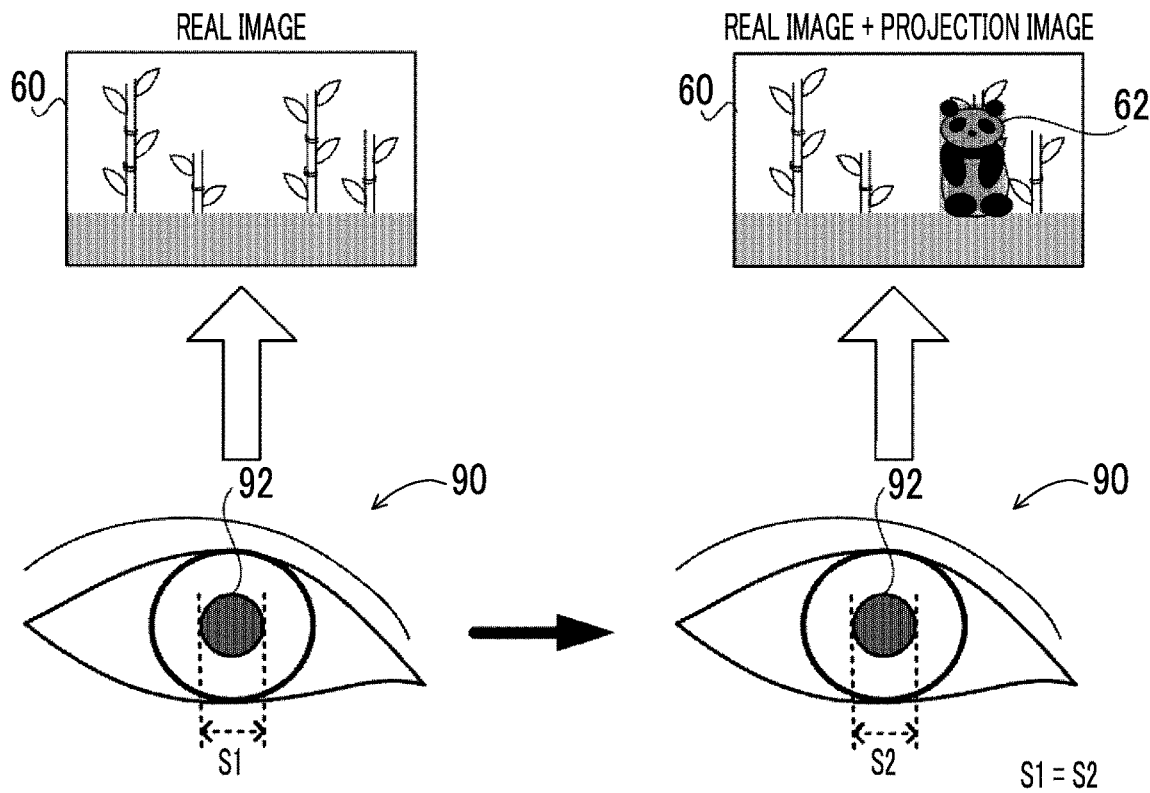
FIG. 6B is a diagram illustrating a relationship between the size of a pupil of an eye that visually recognizes a real image, the size of a pupil of an eye that visually recognizes a projection image superimposed on the real image, and the brightness of the projection image.

Further, FIG. 6B shows a case where the size S1 of the pupil 92 of the eye 90 visually recognizing the real image 60 and the size S2 of the pupil 92 of the eye 90 visually recognizing the projection image 62 superimposed on the real image 60 are equal to each other (S1=S2). Here, "equal" means that an error to be allowed is ignored. In a case where the projection image 62 is too dark, for example, in a case where the projection image 62 is darker than that in the case shown in FIG. 6A, the size of the pupil 92 of the eye 90 is likely to depend on the brightness of the real image 60 and may not respond to the brightness of the projection image 62. For this reason, it is estimated in the case shown in FIG. 6B that the projection image 62 is much darker than the real image 60. In this case, strain on the eye 90 is small but the visibility of the projection image 62 is poor. Accordingly, the smartphone 12 performs a control to increase the brightness of the projection image 62.

Figure 6C:
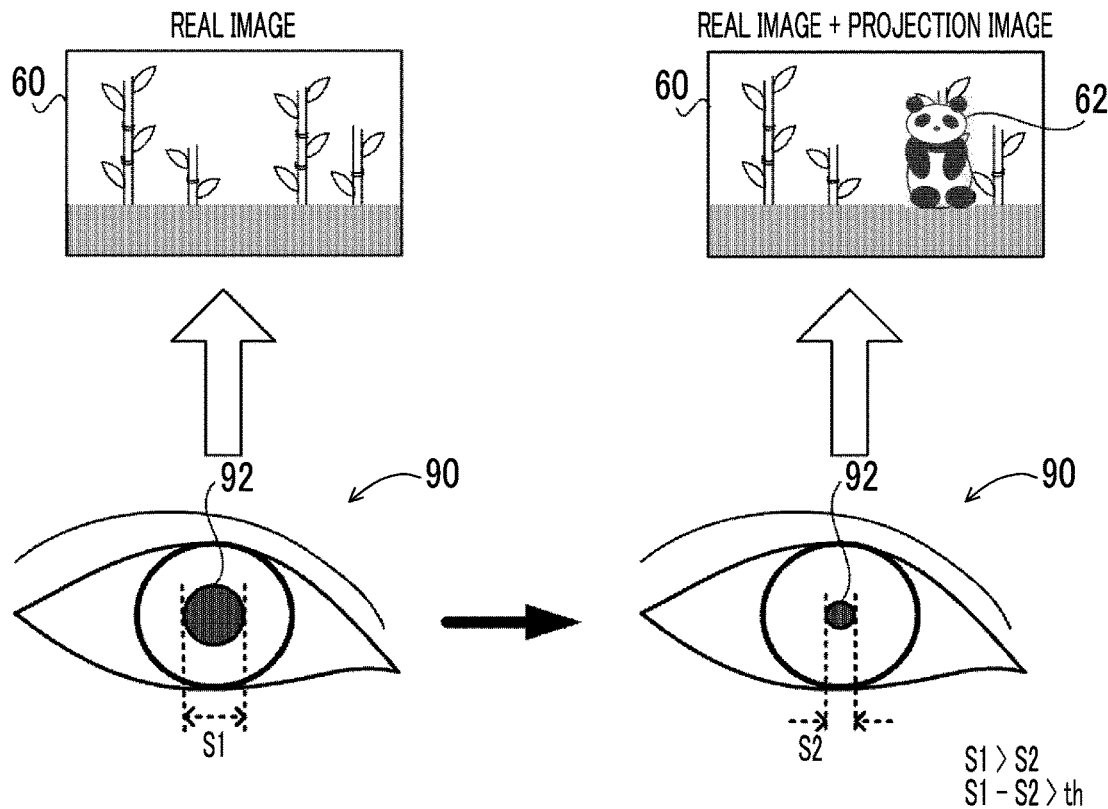
FIG. 6C is a diagram illustrating a relationship between the size of a pupil of an eye that visually recognizes a real image, the size of a pupil of an eye that visually recognizes a projection image superimposed on the real image, and the brightness of the projection image.

Further, FIG. 6C shows a case where the size S2 of the pupil 92 of the eye 90 visually recognizing the projection image 62 superimposed on the real image 60 is smaller than the size S1 of the pupil 92 of the eye 90 visually recognizing the real image 60 and a difference between the size S1 and the size S2 is larger than a predetermined threshold value th (S1>S2 and S1−S2>th). Since the projection image 62 is brighter than the real image 60 and the amount of light of the projection image 62 is large in the case shown in FIG. 6C, the pupil 92 of the eye 90 visually recognizing the projection image 62 contracts. In this case, the visibility of the projection image 62 is good but strain on the eye 90 is large. Accordingly, the smartphone 12 performs a control to reduce the brightness of the projection image 62.

Figure 6D:
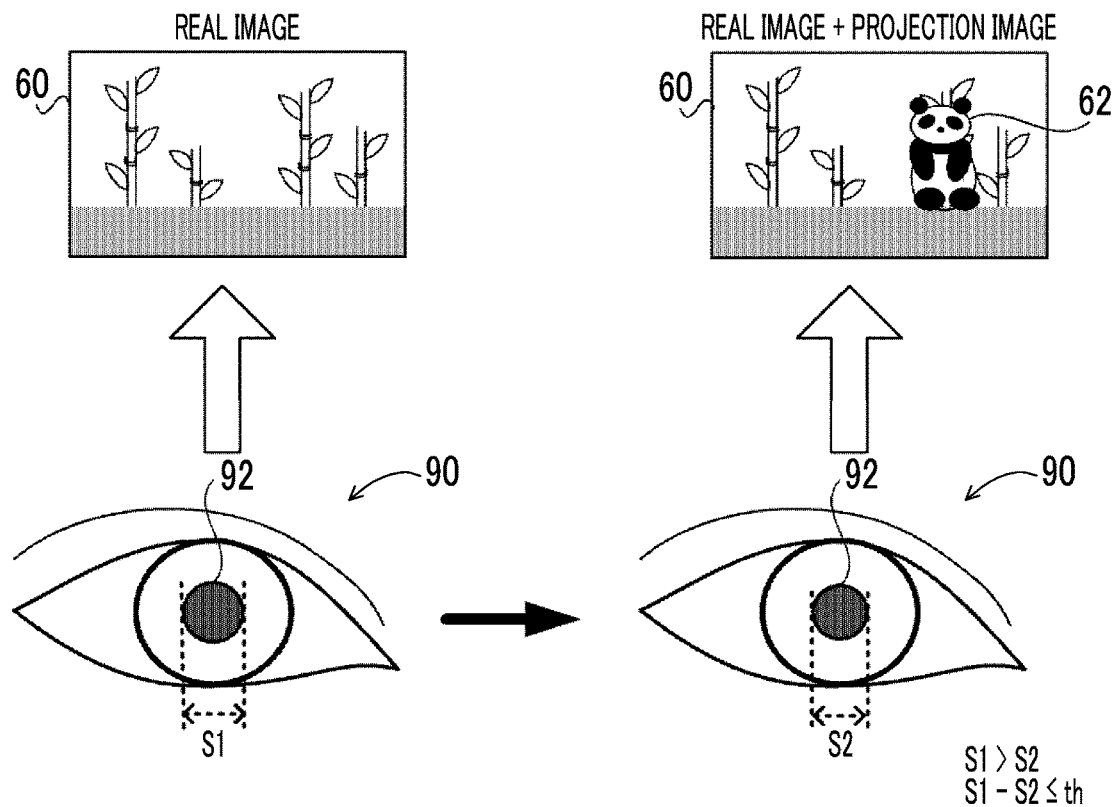
FIG. 6D is a diagram illustrating a relationship between the size of a pupil of an eye that visually recognizes a real image, the size of a pupil of an eye that visually recognizes a projection image superimposed on the real image, and the brightness of the projection image.

Furthermore, FIG. 6D shows a case where the size S2 of the pupil 92 of the eye 90 visually recognizing the projection image 62 superimposed on the real image 60 is smaller than the size S1 of the pupil 92 of the eye 90 visually recognizing the real image 60 and the difference between the size S1 and the size S2 is equal to or smaller than the predetermined threshold value th (S1>S2 and S1−S2≤th). Since the projection image 62 is slightly brighter than the real image 60 and the amount of light of the projection image 62 is slightly large in the case shown in FIG. 6D, the pupil 92 of the eye 90 visually recognizing the projection image 62 slightly contracts. In this case, the visibility of the projection image 62 is good and strain on the eye 90 is also small. Accordingly, the smartphone 12 performs a control to maintain the brightness of the projection image 62 since the brightness of the projection image 62 is appropriate.

A value, which is experimentally derived and obtained on the basis of, for example, a relationship between the brightness of the real image 60 and the projection image 62 and the degree of fatigue of the eye 90, may be set as the threshold value th that is used to determine whether or not the brightness of the above-mentioned projection image 62 is appropriate.

Figure 7:
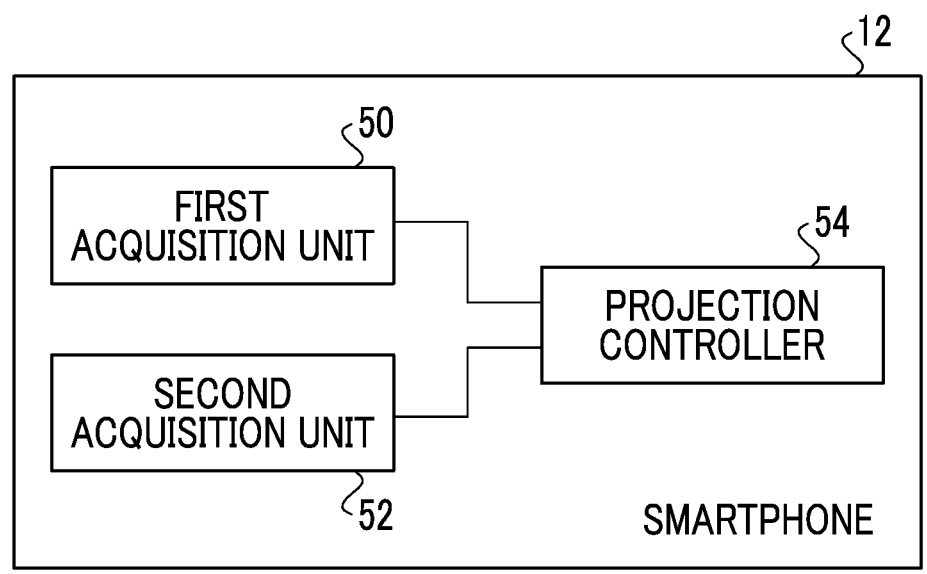
FIG. 7 is a block diagram showing an example of the hardware configuration of the smartphone of the first embodiment.

FIG. 7 is a functional block diagram showing an example of a configuration related to the functions of the smartphone 12 of the present embodiment. As shown in FIG. 4, the smartphone 12 comprises a first acquisition unit 50, a second acquisition unit 52, and a projection controller 54. For example, the processor 40 of the smartphone 12 of the present embodiment executes the projection control program 45 stored in the storage unit 44, so that the processor 40 functions as the first acquisition unit 50, the second acquisition unit 52, and the projection controller 54.

The first acquisition unit 50 has a function of acquiring the size S1 of the pupil 92 on the basis of a detection result of the pupil sensor 27. Specifically, the first acquisition unit 50 acquires the size S1 of the pupil 92, which is obtained in a case where the OLED 26 does not project a projection image, with regard to the size of the pupil 92 of the eye 90 of the user. In other words, the first acquisition unit 50 acquires the size S1 of the pupil 92, which is obtained in a case where the OLED 26 projects a projection image with a brightness of "zero", with regard to the size of the pupil 92 of the eye 90 of the user. The size S1 of the present embodiment is an example of a first size of the present disclosure. The first acquisition unit 50 outputs the acquired size S1 of the pupil 92 to the projection controller 54.

The second acquisition unit 52 has a function of acquiring the size S2 of the pupil 92 on the basis of a detection result of the pupil sensor 27. Specifically, the second acquisition unit 52 acquires the size S2 of the pupil 92, which is obtained in a case where the OLED 26 projects a projection image, with regard to the size of the pupil 92 of the eye 90 of the user. In other words, the second acquisition unit 52 acquires the size S2 of the pupil 92 that is obtained in a case where the OLED 26 projects a projection image with a brightness of "zero" or more. The size S2 of the present embodiment is an example of a second size of the present disclosure. The second acquisition unit 52 outputs the acquired size S2 of the pupil 92 to the projection controller 54.

The projection controller 54 has a function of controlling the brightness of a projection image projected onto the transmission unit 20R for a right eye according to a result of comparison between the size S1 of the pupil 92 and the size S2. The projection controller 54 of the present embodiment performs a control to increase the brightness of the projection image projected from the OLED 26 in a case where the size S2 of the pupil 92 is larger than the size S1 of the pupil 92 as described above with reference to FIG. 6A. Further, the projection controller 54 performs a control to increase the brightness of the projection image projected from the OLED 26 in a case where the size S1 and the pupil 92 and the size S2 of the pupil 92 are equal to each other as described above with reference to FIG. 6B. Furthermore, the projection controller 54 performs a control to reduce the brightness of the projection image projected from the OLED 26 in a case where the size S2 of the pupil 92 is smaller than the size S1 of the pupil 92 and the difference between the size S1 and the size S2 is larger than the threshold value th as described above with reference to FIG. 6C. Moreover, the projection controller 54 performs a control to maintain the brightness of the projection image projected from the OLED 26 in a case where the size S2 of the pupil 92 is smaller than the size S1 of the pupil 92 and the difference between the size S1 and the size S2 is equal to or smaller than the threshold value th as described above with reference to FIG. 6D.

A method corresponding to a device for projecting the projection image 62 or the like may be appropriately employed as a method of controlling the brightness of the projection image 62. Since the OLED 26 is employed as the device for projecting the projection image 62 in the present embodiment, the magnitude of a drive current applied to each pixel of the OLED 26 is adjusted. In a case where the brightness of the projection image 62 is to be increased, the magnitude of the drive current is increased. In a case where the brightness of the projection image 62 is to be reduced, the magnitude of the drive current is reduced.

Figure 8:
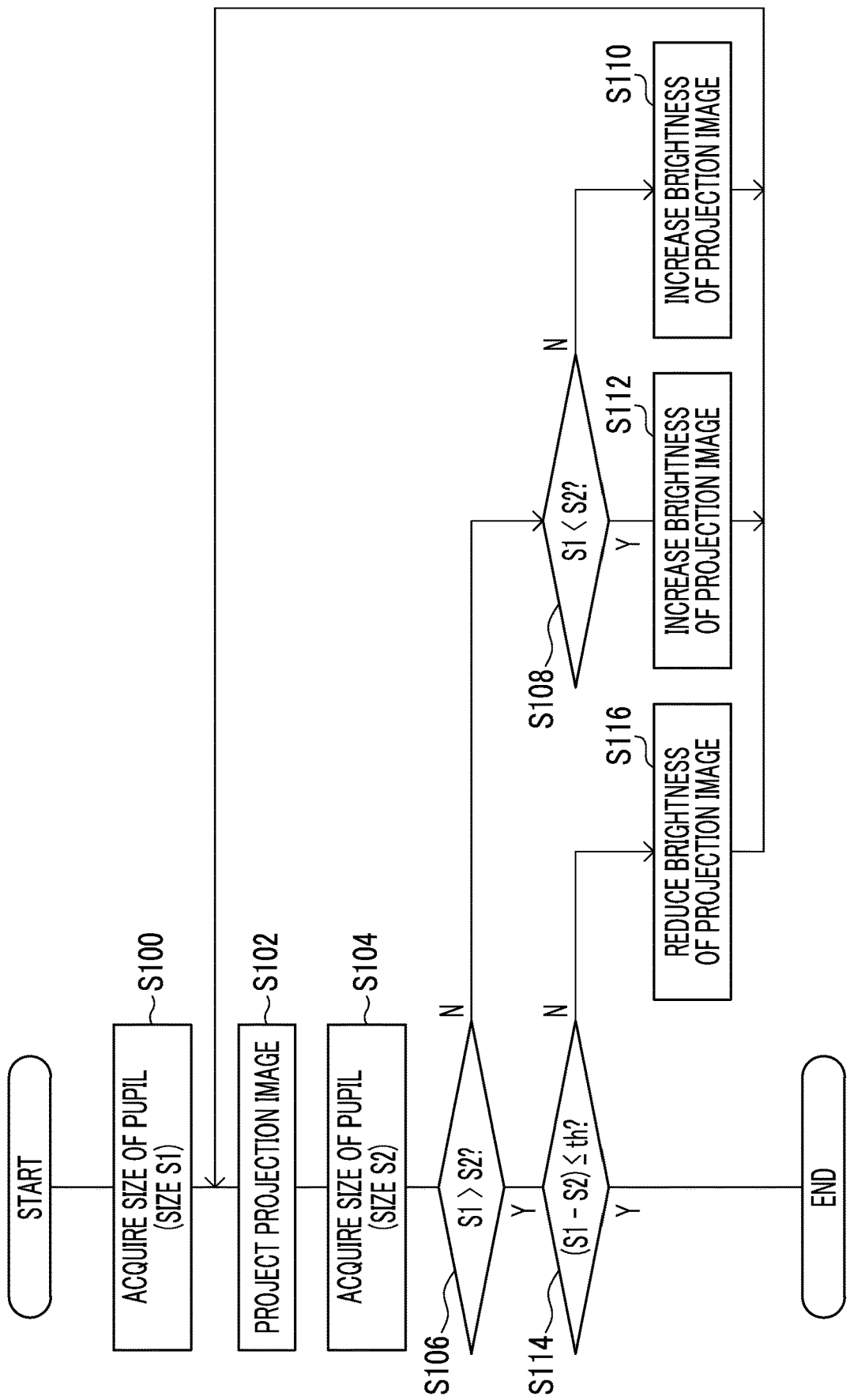
FIG. 8 is a flowchart showing an example of projection control processing that is performed by the smartphone of the first embodiment.

Next, the action of the smartphone 12 of the present embodiment will be described. FIG. 8 is a flowchart showing an example of the flow of projection control processing that is performed by the processor 40 of the smartphone 12 of the present embodiment. For example, in a case where the smartphone 12 of the present embodiment receives an instruction to start to project a projection image input by a user using the input device 48, the processor 40 executes the projection control program 45 stored in the storage unit 44 to perform the projection control processing of which one example is shown in FIG. 8. The user visually recognizes the real image through the transmission unit 20L for a left eye and the transmission unit 20R for a right eye together with the left and right eyes at a point of time when the projection control processing shown in FIG. 8 is started.

In Step S100 of FIG. 8, the first acquisition unit 50 acquires the size S1 of the pupil 92. As described above, the first acquisition unit 50 acquires the size S1 of the pupil 92 from a captured image of the eye 90 of the user that is picked up by the pupil sensor 27.

In the next step S102, the projection controller 54 causes the projection image 62 to be projected. Specifically, the projection controller 54 outputs the image data of the projection image 62 to the OLED 26 so that the projection image 62 is projected onto the light guide plate 24. In a case where the image data of the projection image 62 are input to the OLED 26 from the smartphone 12, the OLED 26 projects the projection image 62 corresponding to the input image data onto the light guide plate 24. The brightness of the projection image 62, which is caused to be projected from the OLED 26 by the projection controller 54 in the processing of Step S102 performed first after the start of the projection control processing shown in FIG. 8, is not particularly limited and can be set to a predetermined brightness. For example, a brightness of a general-purpose projection image obtained from the design of the AR glasses 10 may be used as the predetermined brightness.

In the next step S104, the second acquisition unit 52 acquires the size S2 of the pupil 92. As described above, the second acquisition unit 52 acquires the size S2 of the pupil 92 from the captured image of the eye 90 of the user that is picked up by the pupil sensor 27.

In the next step S106, the projection controller 54 determines whether or not the size S1 acquired in Step S100 is larger than the size S2 acquired in Step S104 (S1>S2). In a case where the size S1 is not larger than the size S2, in other words, in a case where the size S2 is equal to or smaller than the size S2 (S1≤S2), the determination in Step S106 is a negative determination and the processing proceeds to Step S108.

In step S108, the projection controller 54 determines whether or not the size S1 is smaller than the size S2 (S1<S2). In a case where the size S1 is not smaller than the size S2, in other words, in a case where the size S1 and the size S2 are equal to each other (S1=S2), the determination in step S108 is a negative determination and the processing proceeds to Step S110. This case corresponds to the case described above with reference to FIG. 6B. Then, in Step S110, the projection controller 54 performs a control to increase the brightness of the projected projection image 62 and the processing then returns to step S102.

On the other hand, in a case where the size S1 is smaller than the size S2 (S1<S2) in step S108, the determination is an affirmative determination and the processing proceeds to Step S112. This case corresponds to the case described above with reference to FIG. 6A. Then, in Step S112, the projection controller 54 performs a control to increase the brightness of the projected projection image 62 and the processing then returns to step S102.

Further, in a case where the size S1 is larger than the size S2 (S1>S2) in Step S106, the determination is an affirmative determination and the processing proceeds to Step S114.

In Step S114, the projection controller 54 determines whether or not a difference between the size S1 and size S2 is equal to or smaller than a threshold value th ((S1−S2)≤th). In a case where the difference between the size S1 and the size S2 is not equal to or smaller than the threshold value th, in other words, in a case where the difference between the size S1 and the size S2 is larger than the threshold value th ((S1−S2)>th), the determination in Step S114 is a negative determination and the processing proceeds to Step S116. This case also corresponds to the case described above with reference to FIG. 6C. Then, in Step S116, the projection controller 54 performs a control to reduce the brightness of the projected projection image 62 and the processing then returns to Step S102.

On the other hand, in a case where the difference between the size S1 and the size S2 is equal to or smaller than the threshold value th ((S1−S2)≤th) in step S114, the determination in Step S114 is an affirmative determination. This case corresponds to the case described above with reference to FIG. 6D. Then, the projection controller 54 maintains the brightness of the projection image 62 at the current brightness. For this reason, in a case where the determination in step S114 is an affirmative determination, the projection control processing shown in FIG. 8 ends.

As described above, the projection controller 54 of the smartphone 12 of the present embodiment controls the brightness of the projected projection image 62 according to a result of comparison between the size S1 of the pupil 92 in a case where the OLED 26 does not project the projection image 62 and the size S2 of the pupil 92 in a case where the OLED 26 projects the projection image 62 with regard to the size of the pupil 92 of the eye 90 of the user. Therefore, according to the smartphone 12 of the present embodiment, it is possible to maintain the visibility of the projection image 62 well and to reduce strain on the eye 90 of the user.

Second Embodiment

Figure 9:
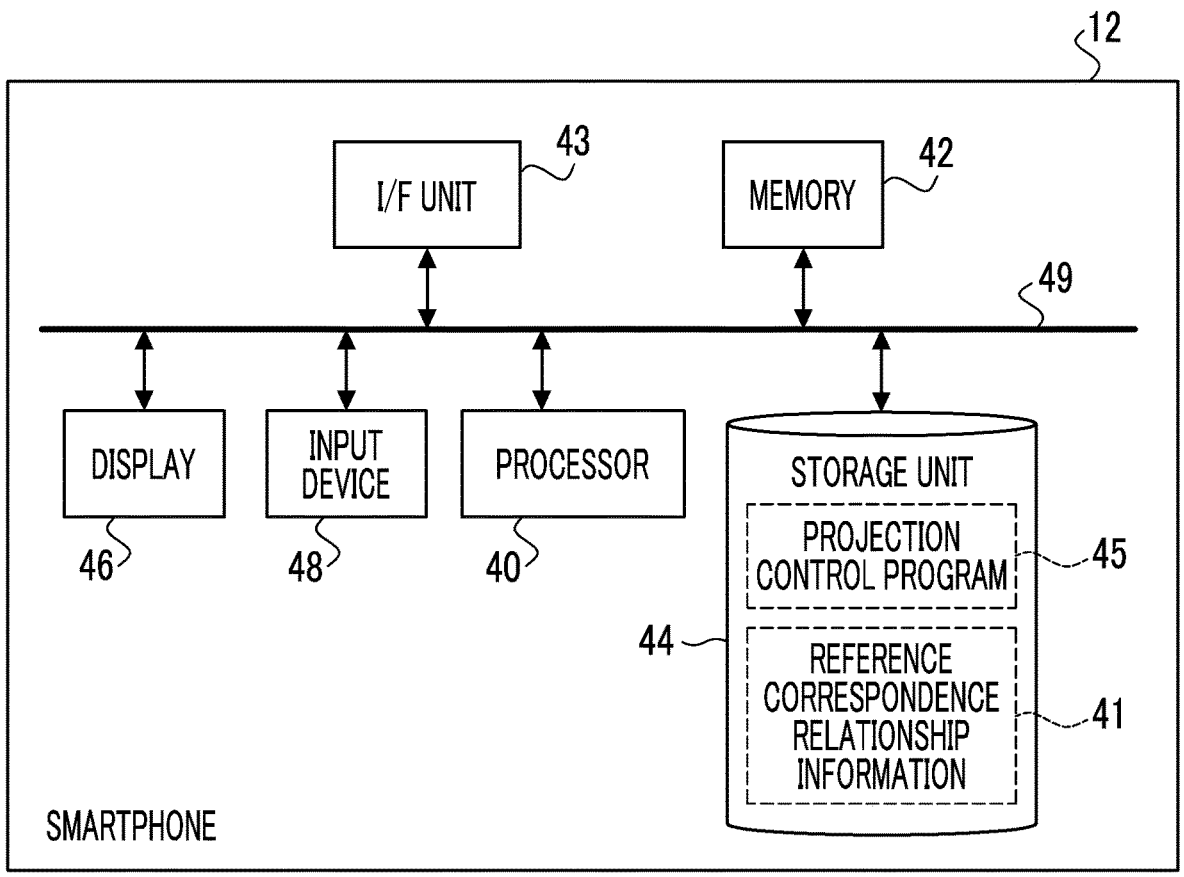
FIG. 9 is a block diagram showing an example of the configuration of a smartphone of a second embodiment.

Since the configuration of AR glasses 10 of the present embodiment is the same as the configuration of the AR glasses 10 of the first embodiment (see FIGS. 1 and 2), the description thereof will be omitted. On the other hand, as shown in FIG. 9, data stored in a storage unit 44 of a smartphone 12 of the present embodiment are different from data stored in the storage unit 44 (see FIG. 4) of the first embodiment. As shown in FIG. 9, the storage unit 44 of the present embodiment further stores reference correspondence relationship information 41.

Figure 10:
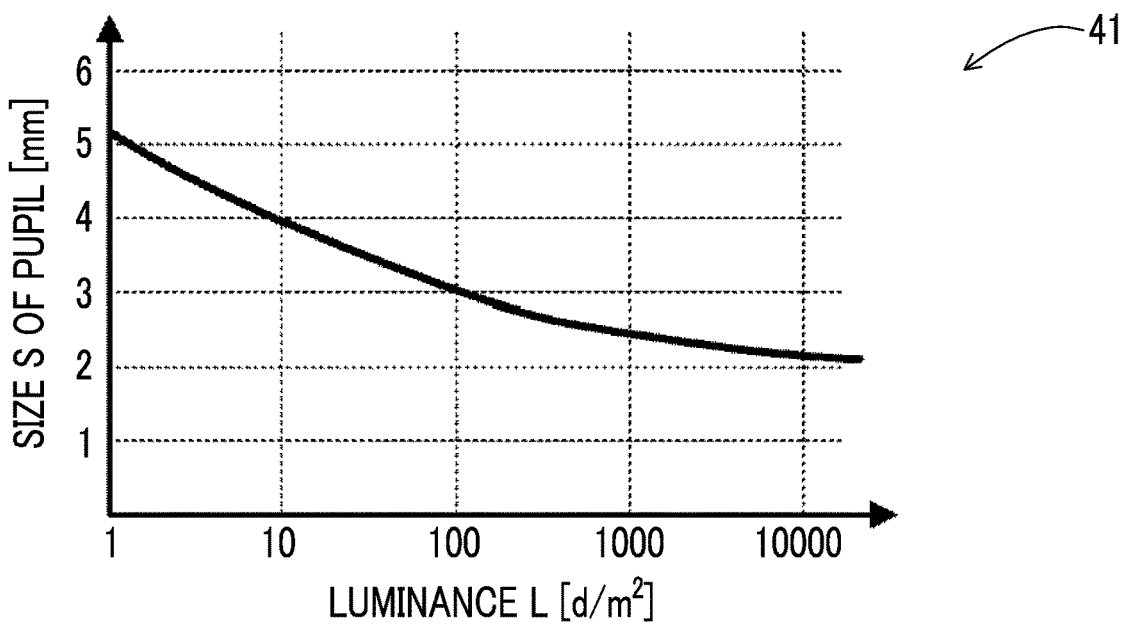
FIG. 10 is a diagram showing an example of reference correspondence relationship information.

The reference correspondence relationship information 41 is information that indicates a correspondence relationship between the brightness (luminance L) of a visually recognized projection image 62 and a size of a pupil 92 of an eye 90 that visually recognizes the projection image 62. FIG. 10 shows an example of the reference correspondence relationship information 41. The reference correspondence relationship information 41 shown in FIG. 10 can be obtained, for example, statistically. The form of the reference correspondence relationship information 41 is not limited. FIG. 10 shows the reference correspondence relationship information 41 in which a correspondence relationship between the brightness (luminance L) of a projection image and a size S of a pupil 92 is shown in the form of a graph (table), but the form of the reference correspondence relationship information 41 is not particularly limited. For example, the reference correspondence relationship information 41 may be expressed as an equation that indicates a correspondence relationship between the brightness (luminance L) of the projection image 62 and the size S of the pupil 92.

Figure 11:
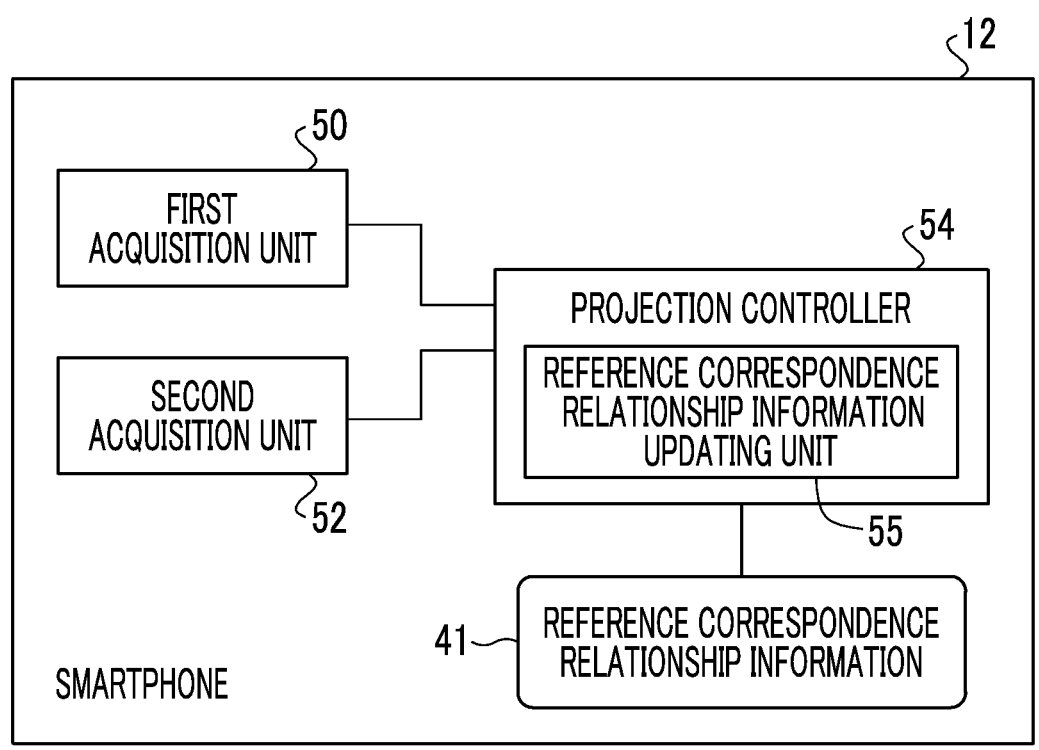
FIG. 11 is a block diagram showing an example of the hardware configuration of the smartphone of the second embodiment.

Further, as shown in FIG. 11, the configuration of a projection controller 54 of the smartphone 12 of the present embodiment is different from the configuration of the projection controller 54 (see FIG. 7) of the first embodiment. The projection controller 54 of the present embodiment has a function of determining the brightness of a projection image 62, which is projected to acquire a size S2 of a pupil 92, on the basis of the reference correspondence relationship information 41.

Furthermore, the projection controller 54 of the present embodiment includes a reference correspondence relationship information updating unit 55. The reference correspondence relationship information updating unit 55 has a function of updating the reference correspondence relationship information 41 using a correspondence relationship between the brightness of the projection image 62, which is controlled according to a result of comparison between the size S1 and the size S2, and the size S1. In other words, the projection controller 54 updates the reference correspondence relationship information 41 using a correspondence relationship between the brightness of the projection image 62, which is made appropriate, and the size S1.

Figure 12:
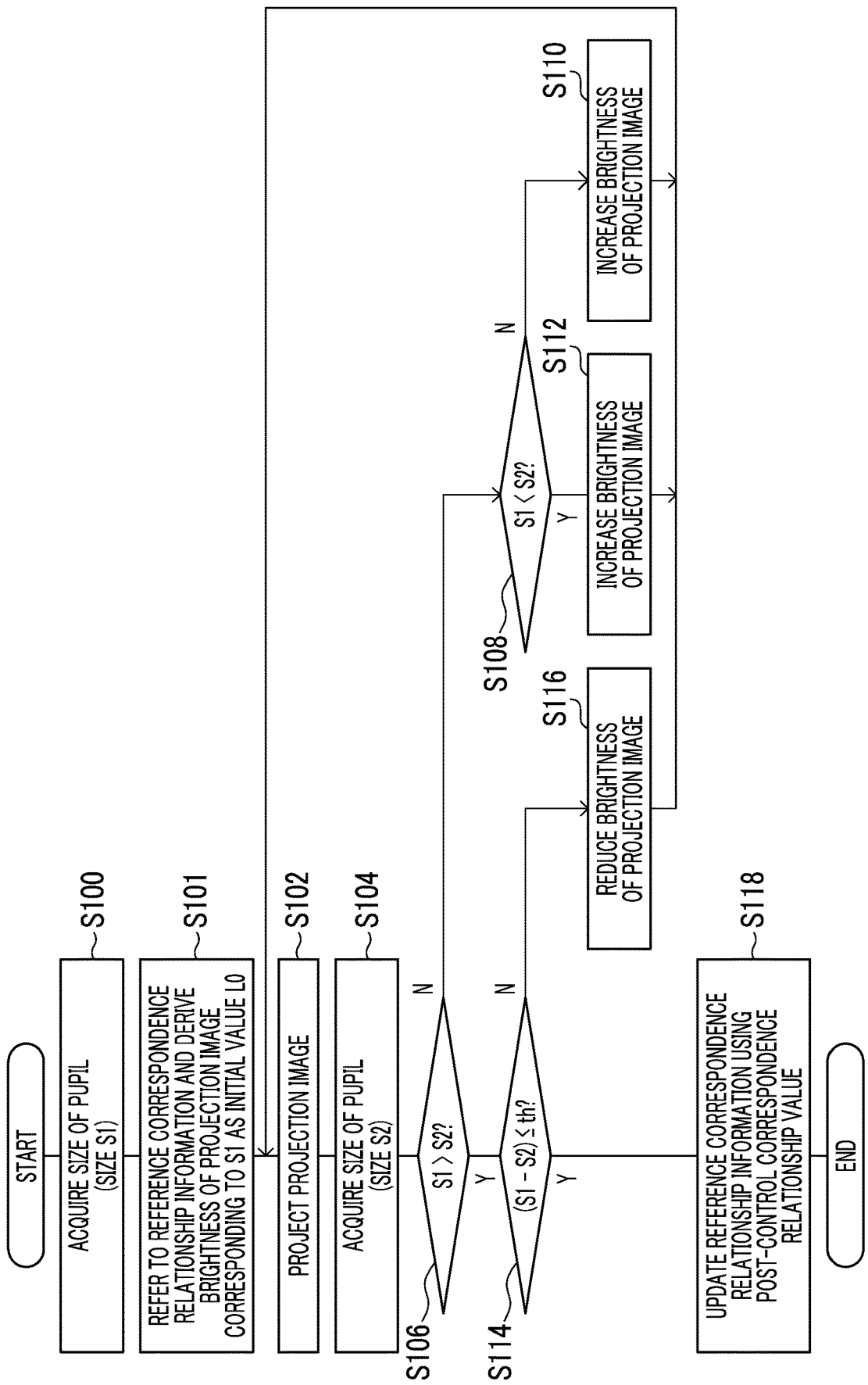
FIG. 12 is a flowchart showing an example of projection control processing that is performed by the smartphone of the second embodiment.

FIG. 12 is a flowchart showing an example of the flow of projection control processing that is performed by the smartphone 12 of the present embodiment. The projection control processing of the present embodiment is different from the projection control processing (see FIG. 8) of the first embodiment in that the projection control processing of the present embodiment comprises step S101 between step S100 and step S102, and comprises step S118 as shown in FIG. 12.

In Step S101 of FIG. 12, the projection controller 54 refers to the reference correspondence relationship information 41 and derives the brightness of the projection image 62, which corresponds to a case where the size S of the pupil 92 is set to the size S1 acquired in Step S100, as an initial value L0 of the brightness of the projection image 62 projected from the OLED 26. Accordingly, in the processing of Step S102 performed first after the start of the projection control processing shown in FIG. 12, the projection controller 54 causes the OLED 26 to project a projection image 62 having a brightness of the initial value L0.

Further, as shown in FIG. 12, in the projection control processing of the present embodiment, the processing proceeds to Step S118 in a case where a determination in Step S114 is an affirmative determination. That is, in the present embodiment, the processing of Step S118 is performed after the brightness of the projection image 62 is controlled to an appropriate brightness.

Figure 13:
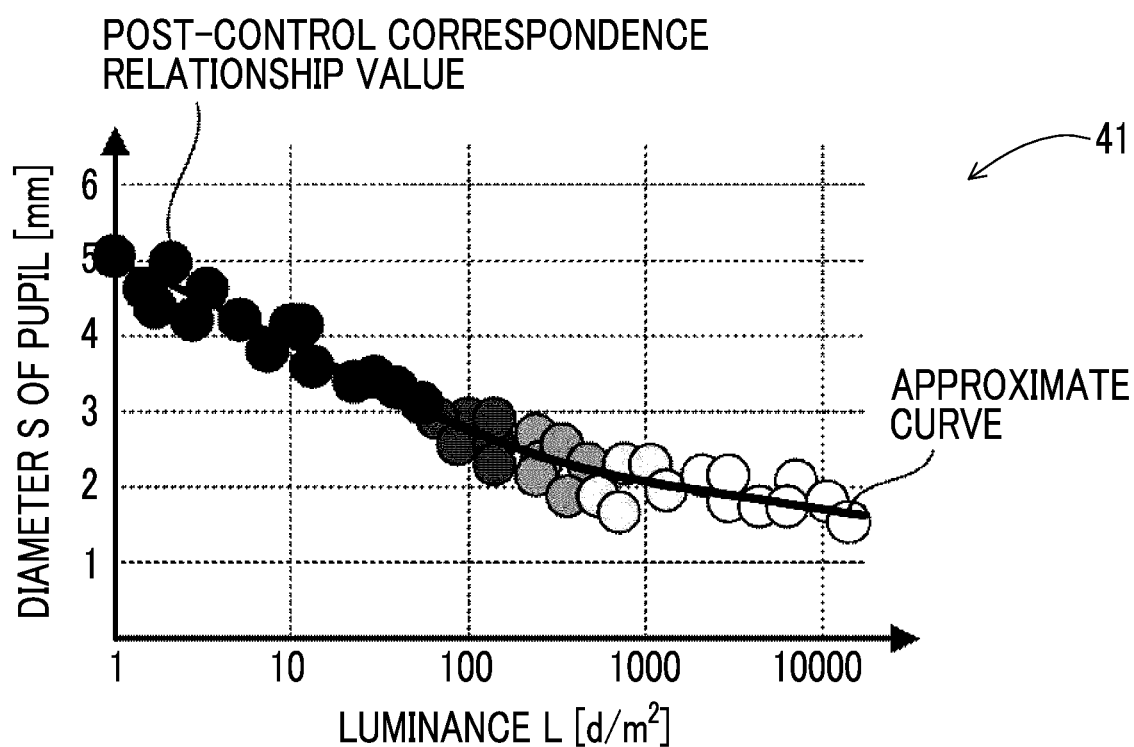
FIG. 13 is a diagram showing an example of reference correspondence relationship information depending on a post-control correspondence relationship.

In step S118, the reference correspondence relationship information updating unit 55 updates the reference correspondence relationship information 41 using a brightness Lz of a final controlled projection image 62 and the size S1 acquired in Step S100. A correspondence relationship between the brightness Lz of the final controlled projection image 62 and the size S1 acquired in Step S100 is referred to as a "post-control correspondence relationship". Further, a value indicating the post-control correspondence relationship will be simplified and referred to as a "post-control correspondence relationship value" in the following description. In a case where the processing of Step S118 ends, the projection control processing of the present embodiment shown in FIG. 12 ends. In the present embodiment, as a method of updating the reference correspondence relationship information 41, a post-control correspondence relationship value may be accumulated as shown in FIG. 13 whenever the projection control processing is performed, and an approximate curve or an approximate expression indicating a correspondence relationship is derived on the basis of a plurality of accumulated post-control correspondence relationship values, and may be used as the reference correspondence relationship information 41.

According to the projection controller 54 of the smartphone 12 of the present embodiment, the initial value L0 of the brightness of the projection image 62 is derived using the reference correspondence relationship information 41 as described above. Therefore, according to the smartphone 12 of the present embodiment, a time required to control the brightness of the projection image 62 to an appropriate brightness can be shortened.

Further, the reference correspondence relationship information updating unit 55 updates the reference correspondence relationship information 41 using a post-control correspondence relationship value corresponding to a result of comparison between the size S1 and the size S2, and the projection controller 54 derives the initial value L0 of the brightness of the projection image 62 using the updated reference correspondence relationship information 41. A change in the size of the pupil 92 varies from person to person. However, since reference correspondence relationship information 41 based on the brightness of a projection image 62 optimal for a user can be obtained in the present embodiment, an initial value L0 of the brightness of an appropriate projection image 62 corresponding to an individual user can be derived. Therefore, according to the smartphone 12 of the present embodiment, a time required to control the brightness of the projection image 62 to an appropriate brightness can be further shortened.

Modification Example 1

Figure 14:
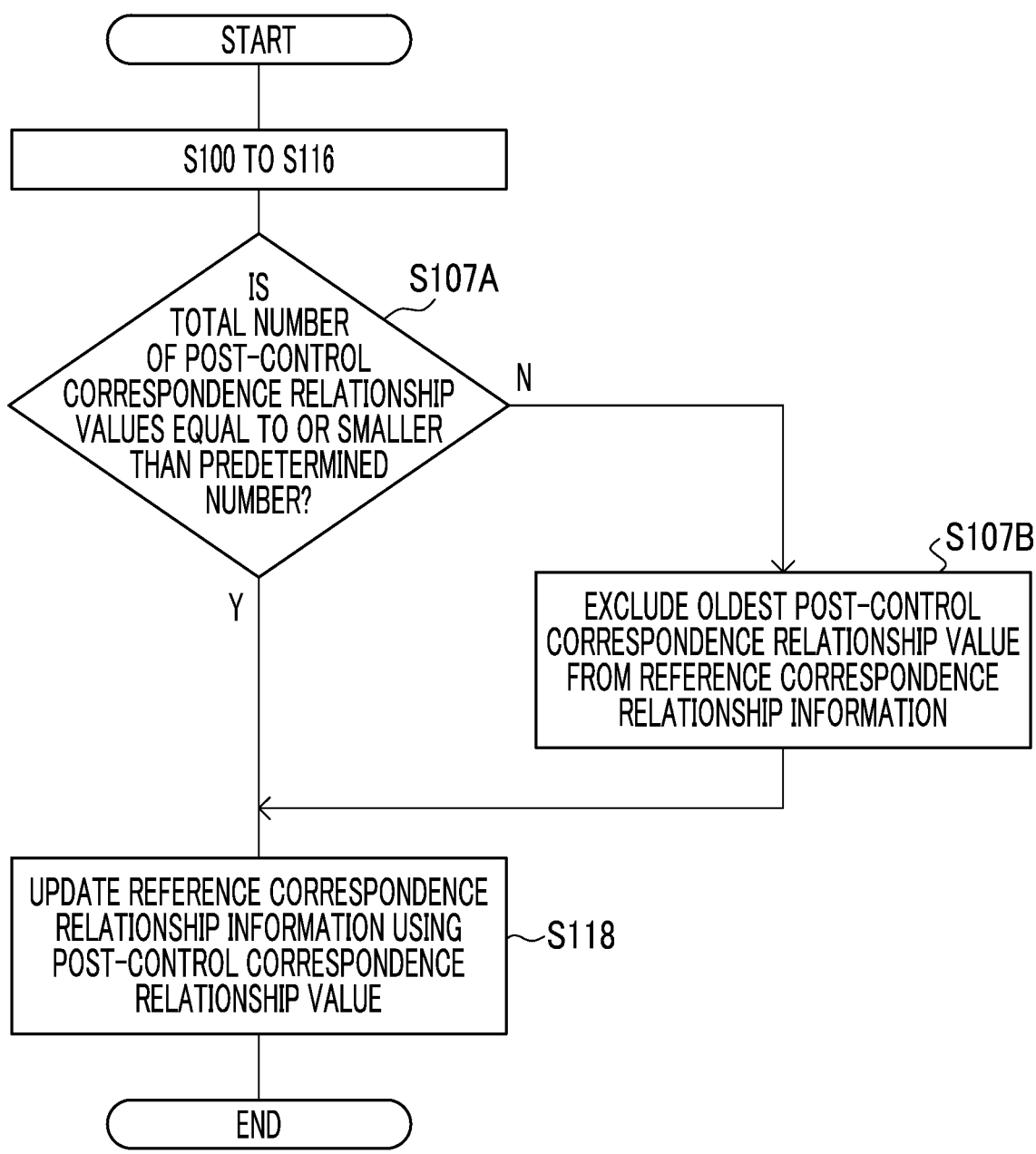
FIG. 14 is a flowchart showing an example of projection control processing that is performed by a smartphone of Modification Example 1.

The reference correspondence relationship information updating unit 55 may sequentially exclude post-control correspondence relationship values having early update timings from the reference correspondence relationship information 41 to control the number of post-control correspondence relationship values, which are included in the reference correspondence relationship information 41, to a predetermined number or less. FIG. 14 is a flowchart showing an example of the flow of projection control processing that is performed by a smartphone 12 of Modification Example 1. The projection control processing of the present modification example is different from the projection control processing (see FIG. 13) of the second embodiment in that the projection control processing of the present modification example comprises Steps S107A and S107B before step S118 as shown in FIG. 14.

In Step S107A of FIG. 14, the reference correspondence relationship information updating unit 55 determines whether or not the total number of accumulated post-control correspondence relationship values including a post-control correspondence relationship value obtained from this projection control processing is equal to or smaller than a predetermined number. In a case where the total number of post-control correspondence relationship values is not equal to or smaller than the predetermined number, in other words, in a case where the total number of post-control correspondence relationship values exceeds the predetermined number, the determination in Step S107A is a negative determination and the processing proceeds to Step S107B. In Step S107B, the reference correspondence relationship information updating unit 55 excludes a post-control correspondence relationship value having the earliest update timing from the reference correspondence relationship information 41 and the processing then proceeds to Step S118.

On the other hand, in a case where the total number of post-control correspondence relationship values is equal to or smaller than the predetermined number in Step S107A, the determination in Step S107A is an affirmative determination and the processing proceeds to step S118.

In the present embodiment, the reference correspondence relationship information 41 can be represented as an approximate curve (see FIG. 13) or the like based on a predetermined number of post-control correspondence relationship values having new update timings by these types of processing. Therefore, according to the reference correspondence relationship information updating unit 55 of the smartphone 12 of the present embodiment, since the number of post-control correspondence relationship values to be stored can be suppressed, the lack of storage capacity caused by the storage of the reference correspondence relationship information 41 can be suppressed. Further, the reference correspondence relationship information updating unit 55 can suppress a throughput required for the derivation of an approximate curve and shorten a time required for processing.

The predetermined number of post-control correspondence relationship values used for the reference correspondence relationship information 41 is not particularly limited, and can be appropriately set according to whether or not a statistically significant approximate curve or the like can be derived, a limitation on storage capacity required for accumulation, the accuracy of the initial value L0 of the brightness of the projection image 62, and the like.

Modification Example 2

A modification example of the control of the number of post-control correspondence relationship values included in the reference correspondence relationship information 41 will be described in the present modification example. A reference correspondence relationship information updating unit 55 of the present modification example controls the number of values, which are included in the reference correspondence relationship information 41 and indicate a post-control correspondence relationship, to a predetermined number or less for each predetermined range determined according to the size of a pupil 92 of an eye 90 in the reference correspondence relationship information 41. The predetermined number of the present modification example is an example of a first predetermined number of the present disclosure.

Figure 15:
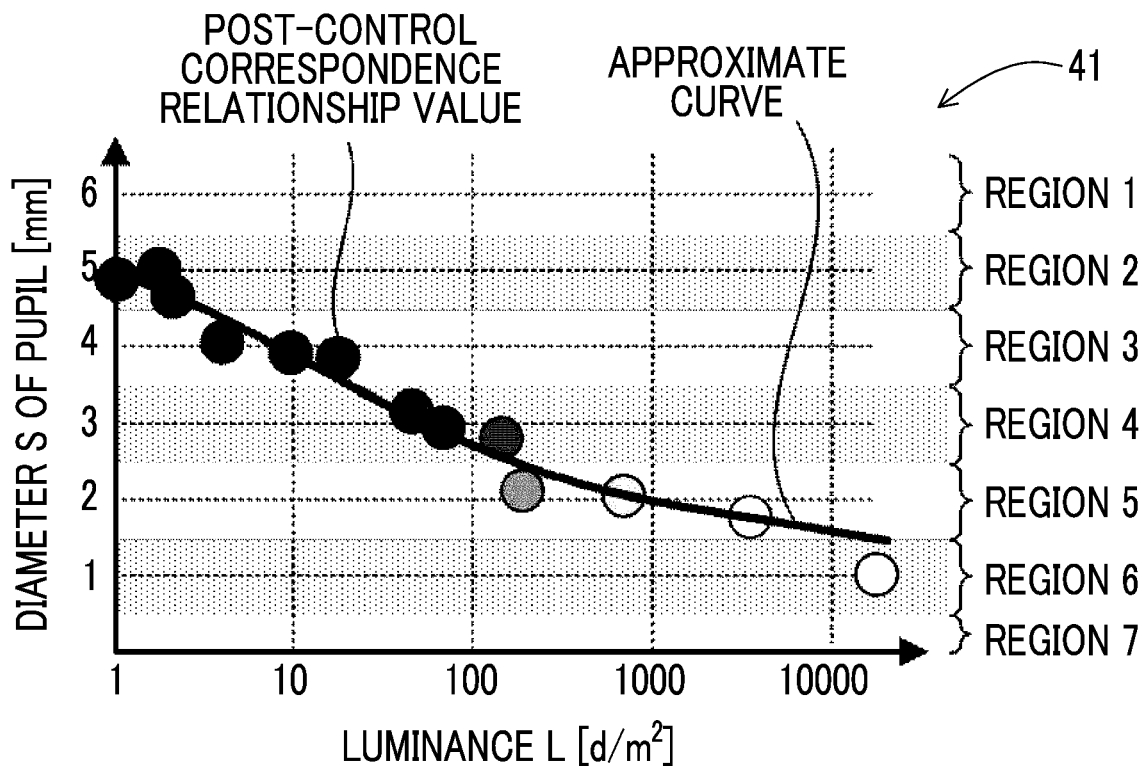
FIG. 15 is a diagram showing an example of reference correspondence relationship information of Modification Example 2.

FIG. 15 shows an example of reference correspondence relationship information 41 in a case where the reference correspondence relationship information updating unit 55 controls the number of post-control correspondence relationship values to "3" or less for each region of regions 1 to 7 divided according to the size of a pupil 92 of an eye 90.

Since post-control correspondence relationship values having early update timings are excluded from the reference correspondence relationship information 41 in this way, it is possible to prevent the size of the pupil 92 from being biased to only a post-control correspondence relationship value corresponding to a specific size. Therefore, according to the reference correspondence relationship information updating unit 55 of the present modification example, the accuracy of the reference correspondence relationship information 41 can be maintained.

Modification Example 3

A modification example of the control of the number of post-control correspondence relationship values included in the reference correspondence relationship information 41 will be described in the present modification example. A reference correspondence relationship information updating unit 55 of the present modification example controls the number of values, which are included in the reference correspondence relationship information 41 and indicate a post-control correspondence relationship, to a predetermined number or less for each predetermined range determined according to the brightness of a visually recognized image in the reference correspondence relationship information 41. The predetermined number of the present modification example is an example of a second predetermined number of the present disclosure.

Figure 16:
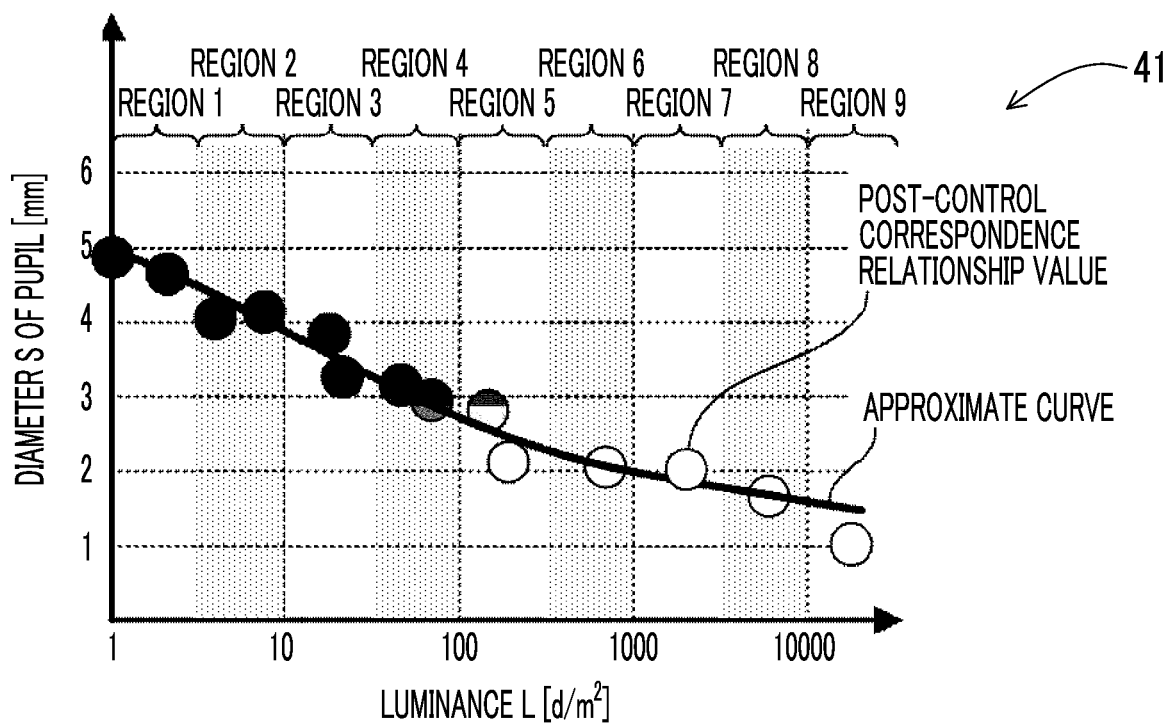
FIG. 16 is a diagram showing an example of reference correspondence relationship information of Modification Example 3.

FIG. 16 shows an example of reference correspondence relationship information 41 in a case where the reference correspondence relationship information updating unit 55 controls the number of post-control correspondence relationship values to "2" or less for each region of regions 1 to 9 divided according to the brightness (luminance) of a visually recognized image.

Since post-control correspondence relationship values having early update timings are excluded from the reference correspondence relationship information 41 in this way, it is possible to prevent the brightness of a visually recognized image from being biased to only a post-control correspondence relationship value corresponding to a specific brightness. Therefore, according to the reference correspondence relationship information updating unit 55 of the present modification example, the accuracy of the reference correspondence relationship information 41 can be maintained.

Modification Example 4

A modification example of the control of the number of post-control correspondence relationship values included in the reference correspondence relationship information 41 will be described in the present modification example. A reference correspondence relationship information updating unit 55 of the present modification example determines a representative value using post-control correspondence relationship values for each predetermined range determined according to the size of a pupil 92 of an eye 90 in the reference correspondence relationship information 41, and derives the reference correspondence relationship information 41 using the representative values.

Figure 17:
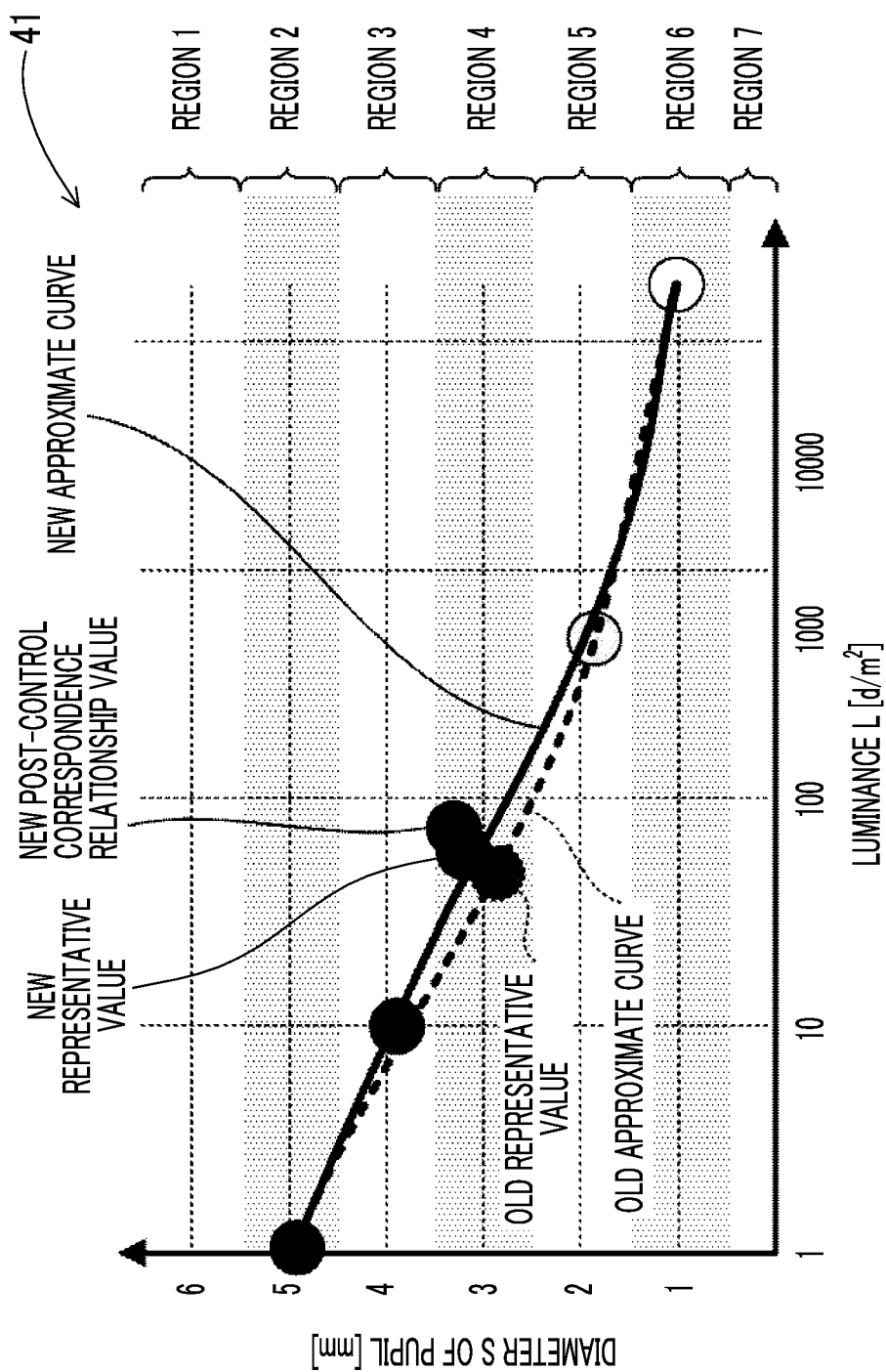
FIG. 17 is a diagram showing an example of reference correspondence relationship information of Modification Example 4.

FIG. 17 shows an example of reference correspondence relationship information 41 in a case where a representative value is determined from post-control correspondence relationship values for each region of regions 1 to 7 divided according to the size of a pupil 92 of an eye 90. In the case shown in FIG. 17, the reference correspondence relationship information updating unit 55 determines one representative value from a plurality of post-control correspondence relationship values for each region in a case where a plurality of post-control correspondence relationship values are obtained for each of the regions 1 to 7.

For this reason, in a case where the reference correspondence relationship information updating unit 55 acquires a new post-control correspondence relationship value, the reference correspondence relationship information updating unit 55 determines a new representative value from a plurality of post-control correspondence relationship values including the new post-control correspondence relationship value to update the representative value. FIG. 17 shows a case where the reference correspondence relationship information updating unit 55 acquires a new post-control correspondence relationship value included in the region 4 to determine a new representative value.

In a case where a representative value is to be determined, it is preferable to weight a post-control correspondence relationship value to determine a new representative value. For example, the reference correspondence relationship information updating unit 55 calculates a new representative value using the following equation (1). A weight W may be set in advance or may be appropriately changed. For example, in a case where the value of W is set to be small, a post-control correspondence relationship value having an early update timing is regarded as important in determining a representative value. Accordingly, a new representative value in which continuity of data is regarded as important can be determined.

$$Dn\_new = W \times D + Dn\_old \times (1-W) \qquad (1)$$

Dn_new: new representative value of region n (n=1 to 7 in FIG. 17)
Dn_old: old representative value of region n
D: new post-control correspondence relationship value
W: weight of new post-control correspondence relationship value, W=0 to 1

Further, the reference correspondence relationship information updating unit 55 derives an approximate curve using the representative value. In a case where the reference correspondence relationship information updating unit 55 determines a new representative value, the reference correspondence relationship information updating unit 55 derives an approximate curve again on the basis of the new representative value. A case where a new approximate curve is derived on the basis of the new representative value determined in region 4 is shown in the example shown in FIG. 17.

Since not post-control correspondence relationship values but representative values determined from the post-control correspondence relationship values are used as described above, it is possible to reduce processing required for the derivation of the reference correspondence relationship information 41 (an approximate curve in the example shown in FIG. 17) while maintaining the accuracy of the reference correspondence relationship information 41.

In the above-mentioned example, the reference correspondence relationship information updating unit 55 determines a representative value using post-control correspondence relationship values for each predetermined range determined according to the size of a pupil 92 of an eye 90 in the reference correspondence relationship information 41. However, a method of determining a representative value is not limited to the present example. For example, the reference correspondence relationship information updating unit 55 may determine a representative value using post-control correspondence relationship values for each predetermined range determined according to the brightness of a visually recognized image in the reference correspondence relationship information 41. Further, for example, the reference correspondence relationship information updating unit 55 may determine a representative value using post-control correspondence relationship values for each predetermined range determined according to the size of a pupil 92 of an eye 90 in the reference correspondence relationship information 41 and the brightness of a visually recognized image in the reference correspondence relationship information 41.

Modification Example 5

A case where statistically obtained reference correspondence relationship information 41 is updated using statistically obtained reference correspondence relationship information 41 in an early stage in which the projection control processing is performed has been described in each of the above-described embodiments. In the present modification example, information, which indicates a correspondence relationship between the brightness of a projection image 62 and a size S1 of a pupil 92 of an eye 90 of a user obtained in cases where the projection image 62 is projected with different brightnesses, is used instead of the statistically obtained reference correspondence relationship information 41.

A change in a size of a pupil 92 varies from person to person, and the degree of a change in a size of a pupil 92 or the like also varies depending on, for example, aging. For this reason, reference correspondence relationship information 41 specialized for an individual user using AR glasses 10 is used in the present modification example.

Figure 18:
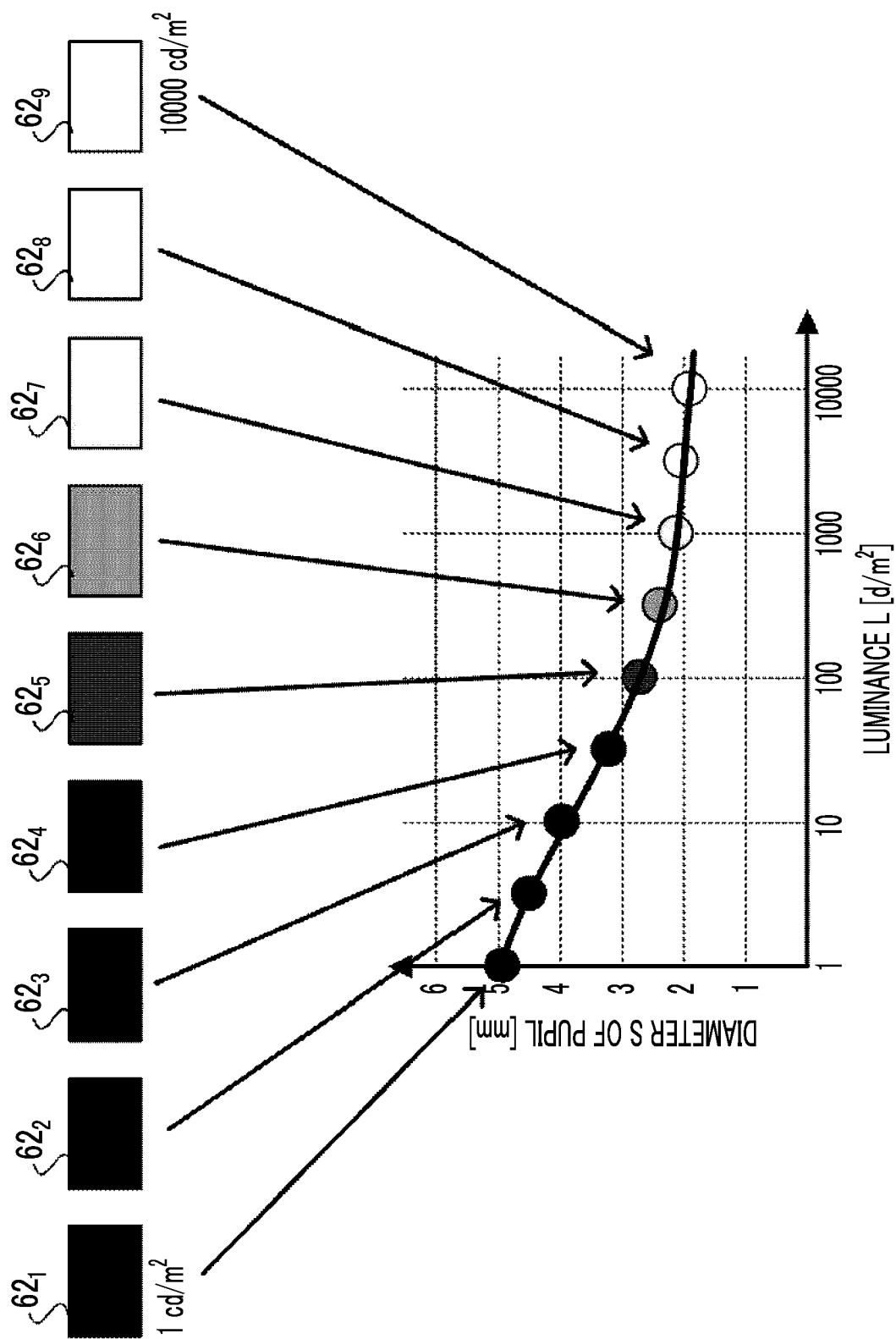
FIG. 18 is a diagram illustrating an example of the derivation of reference correspondence relationship information of Modification Example 5.

In the present modification example, the reference correspondence relationship information updating unit 55 causes the OLED 26 to sequentially project a plurality of projection images 62 having different brightness (luminance) at a predetermined timing, such as when the AR glasses 10 start to be used or before the projection control processing is performed. The first acquisition unit 50 acquires a size S of a pupil 92 of an eye 90 of a user who visually recognizes each projection image 62, and the reference correspondence relationship information updating unit 55 derives reference correspondence relationship information 41 on the basis of the size S of the pupil 92 of the eye 90 of the user who visually recognizes each projection image 62. For example, FIG. 18 shows an example in which reference correspondence relationship information 41 is derived using sizes S obtained in a case where nine projection images 62 ($62_1$ to $62_9$), that is, a projection image $62_1$ having a low brightness (1 cd/m$^2$) to a projection image $62_9$ having a high brightness (10000 cd/m$^2$) are sequentially projected.

A change in a size of a pupil 92 varies from person to person, and the degree of a change in a size of a pupil 92 or the like also varies depending on, for example, aging. Accordingly, reference correspondence relationship information 41 obtained using a relationship between the brightness of a projection image 62, which is actually visually recognized by a user who uses the AR glasses 10, and a size S of a pupil 92 as described above is used in the present modification example. Since reference correspondence relationship information 41 optimized for an individual user is used in the present modification example as described above, an initial value L0 having a higher accuracy can be obtained.

Third Embodiment

In general, sensitivity to brightness, that is, spectral sensitivity characteristics differ depending on a color. Specifically, a way in which the size of a pupil 92 is changed differs depending on the color of a visually recognized projection image 62. For this reason, it is preferable that projection control processing is performed using a projection image 62 in which a tint is adjusted for a user for each color used in the projection image 62 by weighting corresponding to spectral sensitivity characteristics of the pupil 92 of the user.

FIG. 19 is a flowchart showing an example of the flow of weighting acquisition processing that is performed by a processor 40 of a smartphone 12 to obtain weighting corresponding to spectral sensitivity characteristics. For example, a smartphone 12 of the present embodiment performs the weighting acquisition processing shown in FIG. 19 at a predetermined timing, such as a case where a user uses AR glasses 10 for the first time or whenever a predetermined period of use passes. For example, a case where a projection image 62 is a RGB color image will be described in the present embodiment. Further, in order to eliminate the influence of surroundings as much as possible, it is preferable that the weighting acquisition processing is performed in a state where surroundings are dark.

In Step S10 of FIG. 19, a projection controller 54 causes an R monochrome projection image 62 to be projected. Specifically, the projection controller 54 outputs the image data of the projection image 62 to an OLED 26 so that the R monochrome projection image 62 is projected onto a light guide plate 24. In a case where the image data of the R monochrome projection image 62 are input to the OLED 26 from the smartphone 12, the OLED 26 projects the R monochrome projection image 62 corresponding to the input image data onto the light guide plate 24.

In the next step S12, a second acquisition unit 52 acquires a size S_r of a pupil 92. As described above, the second acquisition unit 52 acquires the size S_r of the pupil 92 from a captured image of an eye 90 of the user that is picked up by a pupil sensor 27.

In the next step S14, the projection controller 54 acquires a luminance value corresponding to the size S_r acquired in Step S12. The projection controller 54 of the present embodiment refers to the above-mentioned reference correspondence relationship information 41 (see FIG. 10 and the like), and acquires the luminance value corresponding to the size S_r as a luminance value L_r of the R monochrome projection image 62.

In the next step S16, the projection controller 54 causes a G monochrome projection image 62 to be projected. Specifically, the projection controller 54 outputs the image data of the projection image 62 to the OLED 26 so that the G monochrome projection image 62 is projected onto the light guide plate 24. In a case where the image data of the G monochrome projection image 62 are input to the OLED 26 from the smartphone 12, the OLED 26 projects the G monochrome projection image 62 corresponding to the input image data onto the light guide plate 24.

In the next step S18, the second acquisition unit 52 acquires a size S_g of a pupil 92. As described above, the second acquisition unit 52 acquires the size S_g of the pupil 92 from the captured image of the eye 90 of the user that is picked up by the pupil sensor 27.

In the next step S20, the projection controller 54 acquires a luminance value corresponding to the size S_g acquired in Step S18. The projection controller 54 of the present embodiment refers to the above-mentioned reference correspondence relationship information 41 (see FIG. 10 and the like), and acquires the luminance value corresponding to the size S_g as a luminance value L_g of the G monochrome projection image 62.

In the next step S22, the projection controller 54 causes a B monochrome projection image 62 to be projected. Specifically, the projection controller 54 outputs the image data of the projection image 62 to the OLED 26 so that the B monochrome projection image 62 is projected onto the light guide plate 24. In a case where the image data of the B monochrome projection image 62 are input to the OLED 26 from the smartphone 12, the OLED 26 projects the B monochrome projection image 62 corresponding to the input image data onto the light guide plate 24.

In the next step S24, the second acquisition unit 52 acquires a size S_b of a pupil 92. As described above, the second acquisition unit 52 acquires the size S_b of the pupil 92 from the captured image of the eye 90 of the user that is picked up by the pupil sensor 27.

In the next step S26, the projection controller 54 acquires a luminance value corresponding to the size S_b acquired in Step S20. The projection controller 54 of the present embodiment refers to the above-mentioned reference correspondence relationship information 41 (see FIG. 10 and the like), and acquires the luminance value corresponding to the size S_b as a luminance value L_b of the B monochrome projection image 62.

In the next step S28, the projection controller 54 derives a weight W_r corresponding to an R color, a weight W_g corresponding to a G color, and a weight W_b corresponding to a B color, and stores the weight W_r, the weight W_g, and the weight W_b in the storage unit 44. The projection controller 54 normalizes the luminance value L_r acquired in Step S14, the luminance value L_g acquired in Step S20, and the luminance value L_b acquired in Step S26 to derive a weight W_r corresponding to an R color, a weight W_g corresponding to a G color, and a weight W_b corresponding to a B color. For example, the projection controller 54 of the present embodiment derives the weight W_r, the weight W_g, and the weight W_b using the following equations (2) to (4).

$$W\_r = (L\_r)/(L\_r + L\_g + L\_b) \quad (2)$$

$$W\_g = (L\_g)/(L\_r + L\_g + L\_b) \quad (3)$$

$$W\_b = (L\_b)/(L\_r + L\_g + L\_b) \quad (4)$$

The sum of W_r, W_g, W_b is 1.

According to the following equations (2) to (4), for example, in a case where a user has spectral characteristics that allows the user to be likely to perceive a red color bright, the value of the weight W_r is larger than the value of each of the weights W_g and W_b.

In a case where the processing of Step S28 ends, the weighting acquisition processing shown in FIG. 19 ends.

The smartphone 12 of the present embodiment performs the projection control processing using a projection image 62 in which a tint is adjusted for a user using the weights W_r, W_g, and W_b corresponding to the spectral sensitivity characteristics of the pupil 92 of the user obtained in this way.

Therefore, according to the smartphone 12 of the present embodiment, the projection control processing is performed using a projection image 62 in which a color likely to be perceived bright by a user is adjusted to be dark and a color less likely to be perceived bright by a user is adjusted to be bright. Therefore, according to the smartphone 12 of the present embodiment, the brightness of the projection image 62 can be controlled to a more appropriate brightness.

As described above, the smartphone 12 of the present embodiment comprises the processor 40 that controls the AR glasses 10 to control the projection of the projection image 62. The AR glasses 10 comprises the transmission unit 20R for a right eye that provides a real image to an eye 90 of a user, and the OLED 26 that projects the projection image 62 onto the transmission unit 20R for a right eye such that the projection image 62 can be visually recognized with the eye 90 of the user. The processor 40 acquires a size S1 of the pupil 92, which is obtained in a case where the OLED 26 projects the projection image 62 with a first brightness, such as a brightness of "zero", with regard to the size S of the pupil 92 of the eye 90 of the user. Further, the processor 40 acquires a size S2 of the pupil 92 that is obtained in a case where the OLED 26 projects the projection image 62 with a second brightness higher than the first brightness. Furthermore, the processor 40 controls the brightness of the projection image 62 that is projected onto the transmission unit 20R for a right eye according to a result of comparison between the size S1 and the size S2.

According to the smartphone 12 of each of the above-mentioned embodiments, as described above, the brightness of the projection image 62 is controlled to an appropriate brightness according to a result of comparison between the size S1 and the size S2 of the pupil 92 of the user. Therefore, according to the smartphone 12 of each of the above-mentioned embodiments, it is possible to maintain the visibility of the projection image 62 well and to reduce strain on the eye 90 of the user.

In each of the above-mentioned embodiments, in a case where the size S1 of the pupil 92 of the user is to be acquired, the brightness of the projection image 62 is set to "zero" so that the projection image 62 is not displayed. However, the projection image 62 may be displayed. Further, a case where the projection image is a static image has been described in each of the above-mentioned embodiments, but the projection image may be a video.

Furthermore, the AR glasses 10 may have a light control function of adjusting the transmittance of the real image 60. For example, in a case where the size S1 of the pupil 92 is too small since the surroundings are too bright, the transmittance of the real image 60 may be adjusted by the light control function so that the size S1 is equal to or larger than a predetermined size. Alternatively, in each of the above-mentioned embodiments, the transmittance of the transmission unit 20R for a right eye may be reduced. In a case where the transmittance of the real image 60 is adjusted in this way, an upper limit of the brightness of the projection image 62 can be suppressed to a low value. Accordingly, an increase in power consumption, an increase in the size of the OLED 26, an increase in the weight of the OLED 26, and the like can be suppressed.

Moreover, the AR glasses 10 that are used for a user to visually recognize the projection image 62 with the right eye 90 of the user have been described in each of the embodiments. However, the AR glasses 10 are not limited to the present embodiment and may be AR glasses 10 that are used for a user to visually recognize the projection image 62 with the left eye 90 of the user. Further, the AR glasses 10 may be AR glasses 10 that are used for a user to visually recognize the projection image 62 with each of the left and right eyes 90 of the user. In this case, it is preferable that the smartphone 12 performs projection control processing for each of the left and right eyes 90.

Furthermore, an aspect in which the reference correspondence relationship information 41 is stored in the storage unit 44 of the smartphone 12 has been described in the second embodiment, but a place where the reference correspondence relationship information 41 is stored is not limited to the smartphone 12. For example, the AR glasses 10 may store the reference correspondence relationship information 41.

Moreover, the smartphone 12 has the functions of the first acquisition unit 50, the second acquisition unit 52, and the projection controller 54 in each of the above-mentioned embodiments, but another device may have some or all of the functions of these units. For example, the other device may be the AR glasses 10 or may be a server computer provided on the cloud, or the like.

Further, the following various processors can be used in each of the above-mentioned embodiments as the hardware structures of processing units, which perform various types of processing, such as the first acquisition unit 50, the second acquisition unit 52, and the projection controller 54. The various processors include a programmable logic device (PLD) that is a processor of which the circuit configuration can be changed after manufacture, such as a field programmable gate array (FPGA), a dedicated electrical circuit that is a processor having circuit configuration dedicatedly designed to perform specific processing, such as an application specific integrated circuit (ASIC), and the like in addition to a CPU that is a general-purpose processor functioning as various processing units by executing software (program) as described above.

One processing unit may be formed of one of these various processors, or may be formed of a combination of two or more processors of the same type or different types (for example, a combination of a plurality of FPGAs or a combination of a CPU and an FPGA). Further, a plurality of processing units may be formed of one processor.

As an example where a plurality of processing units are formed of one processor, first, there is an aspect in which one processor is formed of a combination of one or more CPUs and software as typified by a computer, such as a client or a server, and functions as a plurality of processing units. Second, there is an aspect where a processor fulfilling the functions of the entire system, which includes a plurality of processing units, by one integrated circuit (IC) chip as typified by System On Chip (SoC) or the like is used. In this way, various processing units are formed using one or more of the above-mentioned various processors as hardware structures.

In addition, more specifically, electrical circuitry where circuit elements, such as semiconductor elements, are combined can be used as the hardware structures of these various processors.

Further, an aspect in which the projection control program 45 is stored (installed) in the storage unit 44 in advance has been described in each of the above-mentioned embodiments, but the present disclosure is not limited thereto. The projection control program 45 may be provided in forms where the projection control program 45 is recorded in recording mediums, such as a compact disc read only memory (CD-ROM), a digital versatile disc read only memory (DVD-ROM), and a universal serial bus (USB) memory. Furthermore, the projection control program 45 may be downloaded from an external device via a network.

What is claimed is:

1. A control device comprising:
a processor that controls a glasses-type display device to control projection of a projection image, and the glasses-type display device including a transmission unit that provides a real image to an eye of a user and a projector that projects the projection image onto the transmission unit such that the projection image is capable of being visually recognized with the eye of the user,
wherein the processor is configured to:
acquire a first size of a pupil of the eye of the user, which is obtained in a case in which the projector projects the projection image with a first brightness, with regard to the size of the pupil of the eye of the user,
acquire a second size of the pupil, which is obtained in a case in which the projector projects the projection image with a second brightness higher than the first brightness,
control a brightness of the projection image projected onto the transmission unit according to a result of comparison between the first size and the second size,
wherein the processor is configured to perform a control to increase the brightness of the projection image in a case in which the first size is equal to the second size; and
the brightness of the projected image is controlled based solely on the size of the pupil of the eye of the user.

2. The control device according to claim 1,
wherein the processor is configured to perform a control to maintain the brightness of the projection image in a case in which the first size is larger than the second size and a difference between the first size and the second size is equal to or smaller than a predetermined threshold value.

3. The control device according to claim 1,
wherein the processor is configured to perform a control to reduce the brightness of the projection image in a case in which the first size is larger than the second size and a difference between the first size and the second size is larger than a predetermined threshold value.

4. The control device according to claim 1,
wherein the processor is configured to perform a control to increase the brightness of the projection image in a case in which the first size is smaller than the second size.

5. The control device according to claim 1,
wherein, on the basis of reference correspondence relationship information that indicates a correspondence relationship between a brightness of a visually recognized image and a size of a pupil of an eye visually recognizing the image, the processor is configured to derive the brightness of the visually recognized image corresponding to the first size as the brightness of the projection image that is projected to acquire the second size.

6. The control device according to claim 5,
wherein the processor is configured to use information, which indicates a correspondence relationship between the brightness of the projection image and a size of a pupil of the user obtained in cases in which the projection image is projected with different brightnesses, as the reference correspondence relationship information.

7. The control device according to claim 5,
wherein the processor is configured to update the reference correspondence relationship information using values that indicate a post-control correspondence relationship in which the brightness of the projection image controlled according to the result of comparison between the first size and the second size is set as the brightness of the visually recognized image and the first size is set as the size of the pupil of the eye visually recognizing the image.

8. The control device according to claim 7,
wherein the processor is configured to sequentially exclude values, which indicate the post-control correspondence relationship and have early update timings, from the reference correspondence relationship information to control the number of values, which indicate the post-control correspondence relationship and are included in the reference correspondence relationship information, to a predetermined number or less.

9. The control device according to claim 7,
wherein the processor is configured to control the number of values, which indicate the post-control correspondence relationship and are included in the reference correspondence relationship information, to a first predetermined number or less for each predetermined range determined according to the size of the pupil of the eye visually recognizing the image in the reference correspondence relationship information.

10. The control device according to claim 7,
wherein the processor is configured to control the number of values, which indicate the post-control correspondence relationship and are included in the reference correspondence relationship information, to a second predetermined number or less for each predetermined range determined according to the brightness of the visually recognized image in the reference correspondence relationship information.

11. The control device according to claim 5,
wherein the processor is configured to
determine a representative value of values, which indicate a correspondence relationship between the brightness of the visually recognized image and the size of the pupil of the eye visually recognizing the image, for each predetermined range determined according to the size of the pupil of the eye visually recognizing the image in the reference correspondence relationship information, for each predetermined range determined according to the brightness of the visually recognized image in the reference correspondence relationship information, or for each predetermined range determined according to the size of the pupil of the eye visually recognizing the image and the brightness of the visually recognized image in the reference correspondence relationship information, and
derive the reference correspondence relationship information using the representative values.

12. The control device according to claim 11,
wherein the processor is configured to update the representative values using values that indicate a post-control correspondence relationship in which the brightness of the projection image controlled according to the result of comparison between the first size and the second size is set as the brightness of the visually recognized image and the first size is set as the size of the pupil of the eye visually recognizing the image.

13. The control device according to claim 12,
wherein the processor is configured to update the representative values that are obtained by weighting the values indicating the post-control correspondence relationship.

14. A control method performed by a processor of a control device, the processor controlling a glasses-type display device to control projection of a projection image, and the glasses-type display device including a transmission unit that provides a real image to an eye of a user and a projector that projects the projection image onto the transmission unit such that the projection image is capable of being visually recognized with the eye of the user, the control method comprising:
acquiring a first size of a pupil of the eye of the user, which is obtained in a case in which the projector projects the projection image with a first brightness, with regard to the size of the pupil of the eye of the user;
acquiring a second size of the pupil, which is obtained in a case in which the projector projects the projection image with a second brightness higher than the first brightness;
controlling a brightness of the projection image projected onto the transmission unit according to a result of comparison between the first size and the second size;
wherein the controlling is performed to increase the brightness of the projection image in a case in which the first size is equal to the second size; and
the brightness of the projected image is controlled based solely on the size of the pupil of the eye of the user.

15. The control method according to claim 14,
wherein a control to maintain the brightness of the projection image is performed in a case in which the first size is larger than the second size and a difference between the first size and the second size is equal to or smaller than a predetermined threshold value.

16. A non-transitory storage medium storing a control program executed by a processor of a control device, the processor controlling a glasses-type display device to control projection of a projection image, and the glasses-type display device including a transmission unit that provides a real image to an eye of a user and a projector that projects the projection image onto the transmission unit such that the projection image is capable of being visually recognized with the eye of the user, the control program executable by the processor to perform processing comprising:

acquiring a first size of a pupil of the eye of the user, which is obtained in a case in which the projector projects the projection image with a first brightness, with regard to the size of the pupil of the eye of the user;

acquiring a second size of the pupil, which is obtained in a case in which the projector projects the projection image with a second brightness higher than the first brightness;

controlling a brightness of the projection image projected onto the transmission unit according to a result of comparison between the first size and the second size;

wherein the processor performs the controlling to increase the brightness of the projection image in a case in which the first size is equal to the second size; and the processor controls the brightness of the projected image based solely on the size of the pupil of the eye of the user.

17. The non-transitory storage medium according to claim 16, wherein the control program is executable by the processor to maintain the brightness of the projection image is performed in a case in which the first size is larger than the second size and a difference between the first size and the second size is equal to or smaller than a predetermined threshold value.

* * * * *